(12) United States Patent
Ishiyama et al.

(10) Patent No.: US 10,528,464 B2
(45) Date of Patent: Jan. 7, 2020

(54) MEMORY SYSTEM AND CONTROL METHOD

(71) Applicant: Toshiba Memory Corporation, Tokyo (JP)

(72) Inventors: Masahiro Ishiyama, Kawasaki Kanagawa (JP); Shigehiro Asano, Yokosuka Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 27 days.

(21) Appl. No.: 15/802,331

(22) Filed: Nov. 2, 2017

(65) Prior Publication Data

US 2018/0129600 A1 May 10, 2018

(30) Foreign Application Priority Data

Nov. 4, 2016 (JP) .................................. 2016-215831

(51) Int. Cl.
*G06F 3/06* (2006.01)
*G06F 12/02* (2006.01)
(Continued)

(52) U.S. Cl.
CPC .......... *G06F 12/0246* (2013.01); *G06F 3/064* (2013.01); *G06F 3/0611* (2013.01);
(Continued)

(58) Field of Classification Search
CPC .... G06F 11/1076; G06F 11/108; G06F 3/064; G06F 12/0246; G06F 3/0688;
(Continued)

(56) References Cited

U.S. PATENT DOCUMENTS 8,862,820 B2    10/2014  Colgrove et al.
9,097,686 B2    8/2015   Bamba et al.
(Continued)

FOREIGN PATENT DOCUMENTS

JP    2016189209 A    11/2016
WO   2016046970 A1   3/2016

OTHER PUBLICATIONS

I. S. Reed et al.,"Polynomial Codes Over Certain Finite Fields," Journal of the Society for Industrial and Applied Mathematics, vol. 8, No. 2 (Jun. 1960), pp. 300-304.
(Continued)

*Primary Examiner* — Hashem Farrokh
(74) *Attorney, Agent, or Firm* — Kim and Stewart LLP

(57) ABSTRACT

A memory system includes a nonvolatile memory having memory dies controlled in parallel and each including a plurality of physical blocks, and a controller. The controller manages a plurality of logical areas for storing data portions received from the host and parities calculated from the data portions, the logical areas including first and second logical areas for storing first and second parity groups, respectively. Each first parity group includes k data portions received from the host and m parities calculated therefrom. Each second parity group includes k' data portions received from the host and m' parities calculated therefrom. Also, the controller maps each logical area to storage locations in the non-volatile memory dies such that the data portions and the parities of any one parity group are each stored in a different physical block in a set of physical blocks selected from different non-volatile memory dies.

19 Claims, 31 Drawing Sheets

(51) Int. Cl.
*G06F 11/10* (2006.01)
*G06F 1/3203* (2019.01)

(52) U.S. Cl.
CPC .......... *G06F 3/0688* (2013.01); *G06F 11/108* (2013.01); *G06F 1/3203* (2013.01)

(58) Field of Classification Search
CPC ..... G06F 2212/7208; G06F 2212/7201; G06F 2212/1016; G06F 2212/7207; G06F 3/0611; G06F 2212/262
USPC .................................................. 711/103, 114
See application file for complete search history.

(56) References Cited

U.S. PATENT DOCUMENTS

| | | | |
|---|---|---|---|
| 9,990,263 B1* | 6/2018 | Tian | .................... G06F 11/2094 |
| 2013/0019057 A1 | 1/2013 | Stephens | |
| 2013/0042053 A1* | 2/2013 | Huang | .................. G06F 11/106 |
| | | | 711/103 |
| 2013/0132641 A1* | 5/2013 | Suzuki | ................ G06F 12/0246 |
| | | | 711/103 |
| 2013/0179753 A1 | 7/2013 | Flynn et al. | |
| 2017/0075615 A1* | 3/2017 | Imazaki | ................ G06F 11/108 |

OTHER PUBLICATIONS

Maheswaran Sathiamoorthy et al.,"XORing Elephants: Novel Erasure codes for Big Data," Proceedings of the VLDB Endowment, vol. 6, No. 5, Mar. 2013, pp. 325-336.

\* cited by examiner

FIG. 5

AREA MANAGEMENT TABLE 33A

| AREA | RAID CONFIGURATION (k + m) |
|---|---|
| #1 | k=k1,m=m1 |
| #2 | k=k2,m=m2 |
| #3 | k=k3,m=m3 |
| #4 | k=k4,m=m4 |
| #5 | k=k5,m=m5 |
| ⋮ | ⋮ |
| #n | k=kn,m=mn |

| NAND STRUCTURE INFORMATION |
|---|
| PAGE SIZE (CAPACITY) |
| BLOCK SIZE (CAPACITY) |
| SSD CAPACITY (USER CAPACITY) |
| OTHERS |

FIG. 7

VIRTUAL BLOCK MANAGEMENT TABLE  33C

| VIRTUAL BLOCK id (vid) | SET OF DATA PHYSICAL BLOCKS | SET OF PARITY PHYSICAL BLOCKS |
|---|---|---|
| 1 | | |
| 2 | | |
| 3 | | |
| 4 | | |
| 5 | | |
| ⋮ | | |
| n | | |

FIG. 10

| | | 33A | |
|---|---|---|---|
| AREA MANAGEMENT TABLE | | | |
| rid | k | min_m | max_m |
| 1 | 6 | 1 | 3 |

FIG. 11

VIRTUAL BLOCK MANAGEMENT TABLE 33C

| rid | vid | (RELATIVE POSITION OF PEB) | PEB(k) | | | | | PEB(m) | | |
|---|---|---|---|---|---|---|---|---|---|---|
| | | | 0 | 1 | 2 | 3 | 4 | 5 | 0 | 1 | 2 |
| 1 | 12 | | (d7,b12) | (d6,b2) | (d13,b10) | (d9,b9) | (d2,b9) | (d8,b11) | (d15,b13) | (d11,b1) | (d3,b7) |

FIG. 12

| PHYSICAL POSITION OF BLOCK | (d7,b12) | (d6,b2) | (d13,b10) | (d9,b9) | (d2,b9) | (d8,b11) | (d15,b13) | (d11,b1) | (d3,b7) |
|---|---|---|---|---|---|---|---|---|---|
| page 0 | x1 | x2 | x3 | x4 | x5 | x6 | p1 | p2 | p3 |
| page 1 | | | | | | | | | |
| page 2 | | | | | | | | | |
| ... | | | | | | | | | |

FIG. 18

| PHYSICAL POSITION OF BLOCK | (d7,b12) | (d6,b2) | (d13,b10) | (d9,b9) | (d2,b9) | (d8,b11) | (d15,b13) | (d11,b1) | (d3,b7) |
|---|---|---|---|---|---|---|---|---|---|
| page 0 | x1 | x2 | x3 | x4 | x5 | x6 | p1 | p2 | p3 |
| page 1 | | | | | | | | | |
| ... | | | | | | | | | |

REMOVE p2 AND p3 BY RELEASING PHYSICAL BLOCKS (d11, b1) AND (d3, b7)

| PHYSICAL POSITION OF BLOCK | (d7,b12) | (d6,b2) | (d13,b10) | (d9,b9) | (d2,b9) | (d8,b11) | (d15,b13) | (d11,b1) | (d3,b7) |
|---|---|---|---|---|---|---|---|---|---|
| page 0 | x1 | x2 | x3 | x4 | x5 | x6 | p1 | p2 → REMOVED | p3 → REMOVED |
| page 1 | | | | | | | | | |
| ... | | | | | | | | | |

FIG. 19

Virtual Block Management Table (33C):

| rid | vid | (RELATIVE POSITION OF PEB) | PEB(k) | | | | | PEB(m) | | |
|---|---|---|---|---|---|---|---|---|---|---|
| | | | 0 | 1 | 2 | 3 | 4 | 5 | 0 | 1 | 2 |
| 1 | t2 | | (d7,b12) | (d6,b2) | (d13,b10) | (d9,b9) | (d2,b9) | (d8,b11) | (d15,b13) | (d11,b1) | (d3,b7) |

⇒

Virtual Block Management Table (33C):

| rid | vid | (RELATIVE POSITION OF PEB) | PEB(k) | | | | | PEB(m) | | |
|---|---|---|---|---|---|---|---|---|---|---|
| | | | 0 | 1 | 2 | 3 | 4 | 5 | 0 | 1 | 2 |
| 1 | t2 | | (d7,b12) | (d6,b2) | (d13,b10) | (d9,b9) | (d2,b9) | (d8,b11) | (d15,b13) | (RELEASED) | (RELEASED) |

| PRIORITY | | |
|---|---|---|
| | DIE GROUP #1 | k=k1,m=m1 |
| | DIE GROUP #2 | k=k2,m=m2 |
| | DIE GROUP #3 | k=k3,m=m3 |
| | DIE GROUP #4 | k=k4,m=m4 |

LIMIT NUMBER OF TIMES OF WRITE OPERATION SIMULTANEOUSLY PERFORMED ON DIE GROUP #1 TO BE EQUAL TO OR LESS THAN m OF DIE GROUP #1

| x1 | x2 | x3 | x4 | px1 |
|---|---|---|---|---|
| x5 | x6 | x7 | x8 | px2 |
| x9 | x10 | x11 | x12 | px3 |
| x13 | x14 | x15 | x16 | px4 |
| py1 | py2 | py3 | py4 | py5 |

# MEMORY SYSTEM AND CONTROL METHOD

CROSS-REFERENCE TO RELATED APPLICATION

This application is based upon and claims the benefit of priority from Japanese Patent Application No. 2016-215831, filed Nov. 4, 2016, the entire contents of which are incorporated herein by reference.

FIELD

Embodiments described herein relate generally to a memory system including a non-volatile memory.

BACKGROUND

In recent years, memory systems implementing a non-volatile memory have been widely used. As one of the memory systems, solid-state drives (SSDs) implementing a NAND flash memory are known. The SSDs are used as main storages of various computing devices.

In general, the NAND flash memory mounted in the SSD includes a plurality of NAND flash memory dies. These dies maybe operated in parallel. However, processes (e.g., a write operation, a read operation, and the like) for one die are sequentially performed. Thus, when a read request for a die that is performing a write operation, is received (i.e., when a die collision occurs), there are some cases where a reply time of the read request known as read latency is considerably longer than a typical read latency.

Accordingly, in order to improve the performance of the SSD, there is a need for new technology that improves tolerance to die collision, in particular when a read request is received for a die which is performing a write operation.

DESCRIPTION OF THE DRAWINGS

FIG. 5 is a diagram showing an area management table managed by the memory system according to the embodiment.

FIG. 6 is a diagram showing NAND structure information managed by the memory system according to the embodiment.

FIG. 7 is a diagram showing a virtual block management table managed by the memory system according to the embodiment.

FIG. 10 is a diagram showing an example of the area management table managed by the memory system according to the embodiment.

FIG. 11 is a diagram showing an example of the virtual block management table managed by the memory system according to the embodiment.

FIG. 12 is a diagram for describing a set of data portions and a set of parities distributed and written in a plurality of physical blocks by the memory system according to the embodiment.

FIG. 18 is a diagram for describing a parity removing process performed by the memory system according to the embodiment.

FIG. 19 is a diagram showing an updating process of the virtual block management table performed by the memory system according to the embodiment when the parity removing process in FIG. 18 is performed.

DETAILED DESCRIPTION

Figure 1:
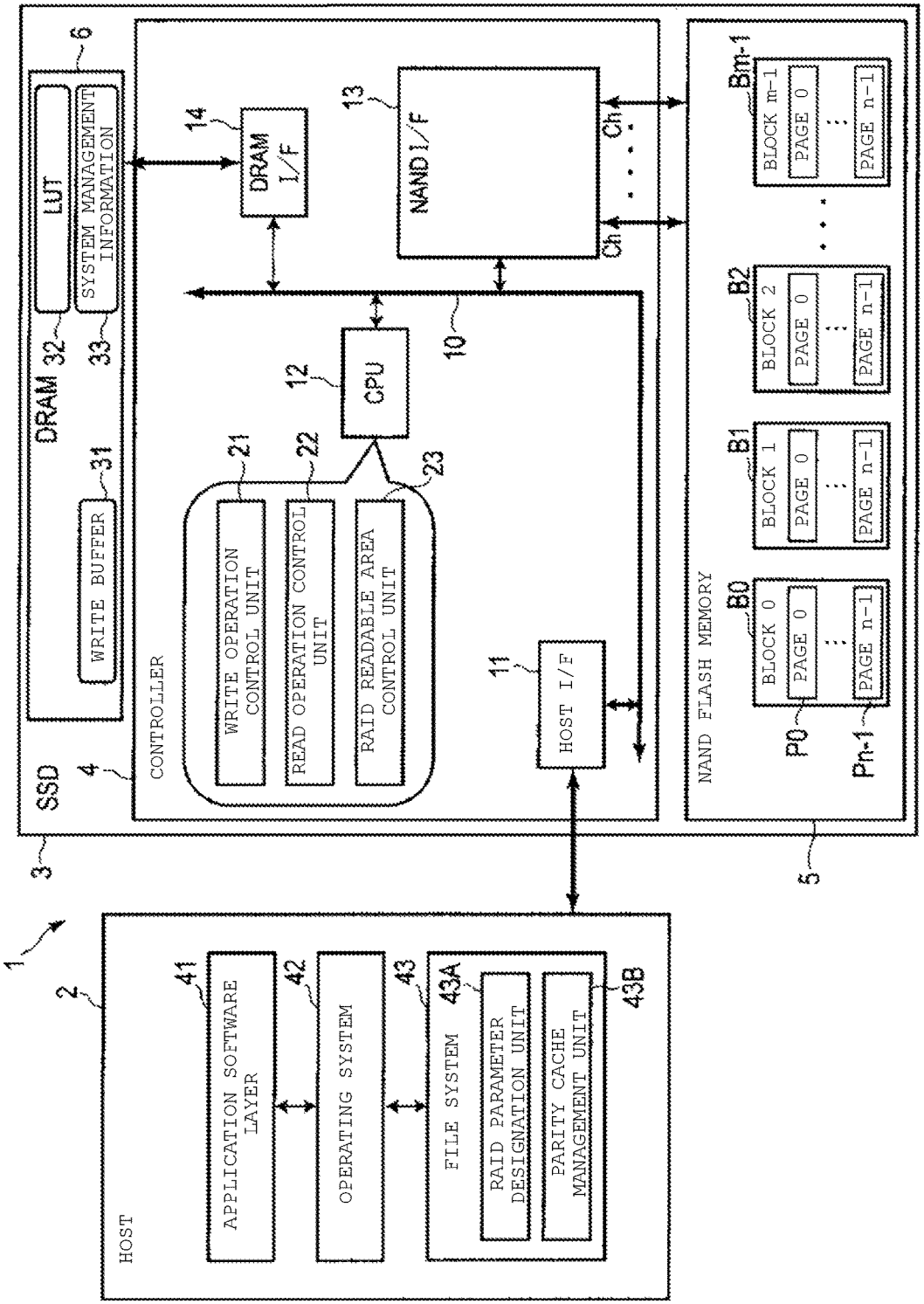
FIG. 1 is a block diagram showing a configuration example of a memory system according to an embodiment.

Embodiments provide a memory system and a control method capable of improving tolerance to an occurrence of a read request for a die which is performing a write operation.

In general, according to one embodiment, a memory system capable of being connected to a host includes a nonvolatile memory having a plurality of memory dies that are controlled in parallel, each of the memory dies including a plurality of physical blocks, and a controller. The controller is configured to manage a plurality of logical areas for storing data portions received from the host and parities calculated from the data portions, the logical areas including a first logical area for storing first parity groups, each of which includes k data portions received from the host and m parities calculated from the k data portions, and a second logical area for storing second parity groups, each of which includes k' data portions received from the host and m' parities calculated from the k' data portions, where k and k' are each 2 or more, and m and m' are each 1 or more and are different from each other. The controller is further configured to map each of the logical areas to storage locations in the non-volatile memory dies such that the data portions and the parities belonging to any one parity group are each stored in a different physical block in a set of physical blocks that are selected from different non-volatile memory dies.

Hereinafter, embodiments will be described with reference to the drawings.

Initially, a configuration of an information processing system 1 including a memory system according to an embodiment is described with reference to FIG. 1.

The memory system is a semiconductor storage device that is configured to write data in a non-volatile memory and read data from the non-volatile memory. For example, the memory system is realized as a solid-state drive (SSD) 3 including a NAND flash memory.

The information processing system 1 includes a host (or host device) 2, and an SSD 3. The host 2 is an information processing device (e.g., computing device) that accesses the SSD 3. The host 2 may be a storage server that stores various massive data items in the SSD 3, or may be a personal computer.

The SSD 3 may be used as a main storage of the information processing device functioning as the host 2. The SSD 3 may be built in the information processing device, or may be connected to the information processing device through a cable or a network.

SCSI, Serial Attached SCSI (SAS), ATA, Serial ATA (SATA), PCI Express® (PCIe), Ethernet®, Fibre Channel, or NVM Express® (NVMe) may be used as an interface for connecting the host 2 and the SSD 3.

The SSD 3 includes a controller 4, and a non-volatile memory (e.g., NAND flash memory) 5. The SSD 3 may include a random-access memory, for example, a DRAM 6.

The NAND flash memory 5 includes a memory cell array. The memory cell array includes a plurality of physical blocks B0 to Bm-1. The physical blocks B0 to Bm-1 function as erase units. The physical blocks are also referred to as "erase blocks" or are simply referred to as "physical erase blocks".

The physical blocks B0 to Bm-1 include a plurality of pages (physical pages). That is, each of the physical blocks B0 to Bm-1 includes pages P0 to Pn-1. In the NAND flash memory 5, the reading of data and the writing of data are performed on a page basis. An erasing operation for erasing data is performed on per physical block basis.

The controller 4 is electrically connected to the NAND flash memory 5 which is the non-volatile memory through a NAND interface 13 such as Toggle or ONFI.

Figure 2:
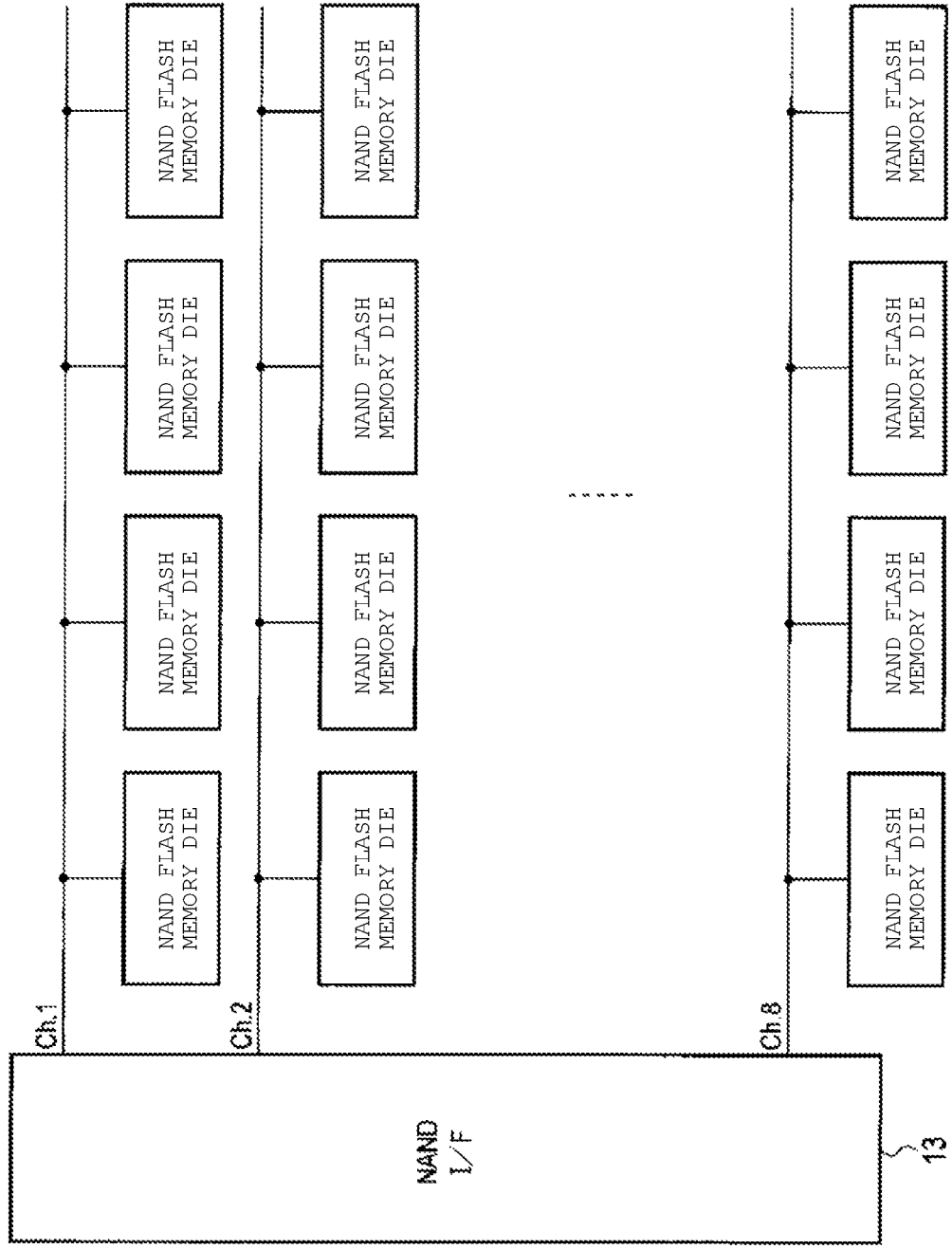
FIG. 2 is a block diagram showing the relationship between a plurality of NAND flash memory dies and a NAND interface within the memory system according to the embodiment.

As shown in FIG. 2, the NAND flash memory 5 includes a plurality of NAND flash memory dies (more generally referred to as non-volatile memory dies). The dies may be independently operated. Thus, the dies function as minimum units capable of being operated in parallel. For example, the dies may function as parallel operation units capable of performing operations such as a write operation and a read operation independently of each other. Furthermore, when a plurality of planes included in one die is capable of performing operations such as a write operation and a read operation independently of each other, these planes may be sometimes referred to as a die or a parallel operation unit.

Each NAND flash memory die includes a memory cell array including a plurality of memory cells arranged to have a matrix configuration. The memory cell array is organized by a plurality of physical blocks. Each physical block is organized by a plurality of pages. FIG. 2 shows a case where eight channels (Ch. 1 to Ch. 8) are connected to the NAND interface 13 and four NAND flash memory dies are connected to each of the eight channels. Each channel includes a communication line (memory bus) for communicating with the corresponding NAND flash memory dies. Under the control of the controller 4, the NAND interface 13 may access 32 NAND flash memory dies through the eight channels. The number of NAND flash memory dies mounted on the SSD 3 is not limited to 32, and any number of NAND flash memory dies may be mounted on the SSD 3. The number of channels is not limited to eight, and any number of channels may be used.

Incidentally, in recent years, there is an increasing demand for read reply performance of a fast storage device typified by an SSD. Particularly, a latency (reply times to an access request) called a tail latency which is extremely longer than an average value of latencies may be a problem, and particularly, there is demand for high predictability of reply times to a read request (i.e., read latency).

As one of causes of a change of the read latency, there is a collision of access to the NAND flash memory. Processes (e.g., a write operation, a read operation, and an erasing operation) for one NAND flash memory die (simply referred to as a die) are not performed in parallel, and are sequentially performed. That is, since the dies are the parallel operation units, if there are enough dies, apart from a limitation due to the bandwidth of the channels, the same number of processes as the number of dies can be performed in parallel.

In general, it takes a longer time to perform a write operation on the NAND flash memory than a read operation. Thus, when a read request for the die that is performing the write operation is received during the write operation (i.e., when a die collision occurs), a latency of the read request is considerably longer than that in a usual case, and thus, the read latency is changed.

In the NAND flash memory, only the physical blocks that have been erased may be written. Thus, an erase process needs to be performed on a physical block basis before a write operation is initially performed on the physical block. Even when a read request for the die which is performing the erase process is received (which is another example of die collision), the read latency is considerably longer than that in a usual case.

In the writing of data to the SSD from the host, a storage position in which data is to be written is typically represented by a logical address called logical block address (LBA).

Meanwhile, the allocation of the LBAs to the blocks of the dies is typically concealed in the SSD, and thus, the host is not able to recognize such assignment.

Thus, when the host performs the writing, the host is not able to specify the die which is performing the write operation. Accordingly, the host is not able to specify the request causing the die collision.

The die collision can be regarded as a kind of failure. This failure can be solved by grouping a plurality of data portions (e.g., data blocks) and adding parity to the data group. Such a technology is used in RAID.

When the parity is added to a certain data group, even in a case where some data portion within the data group cannot be read, by using other data portions within the data group and the parity, it is possible to restore the data portions which cannot be read.

In the present embodiment, the SSD 3 calculates the parity from the plurality of data portions of the data group for each data group written in the SSD 3, and writes the plurality of data portions and the parity within the data group over different NAND flash memory dies. As stated above, the parity is retained in each data group within the SSD 3, and thus, it is possible to reduce the effect of the die collision.

Figure 3:
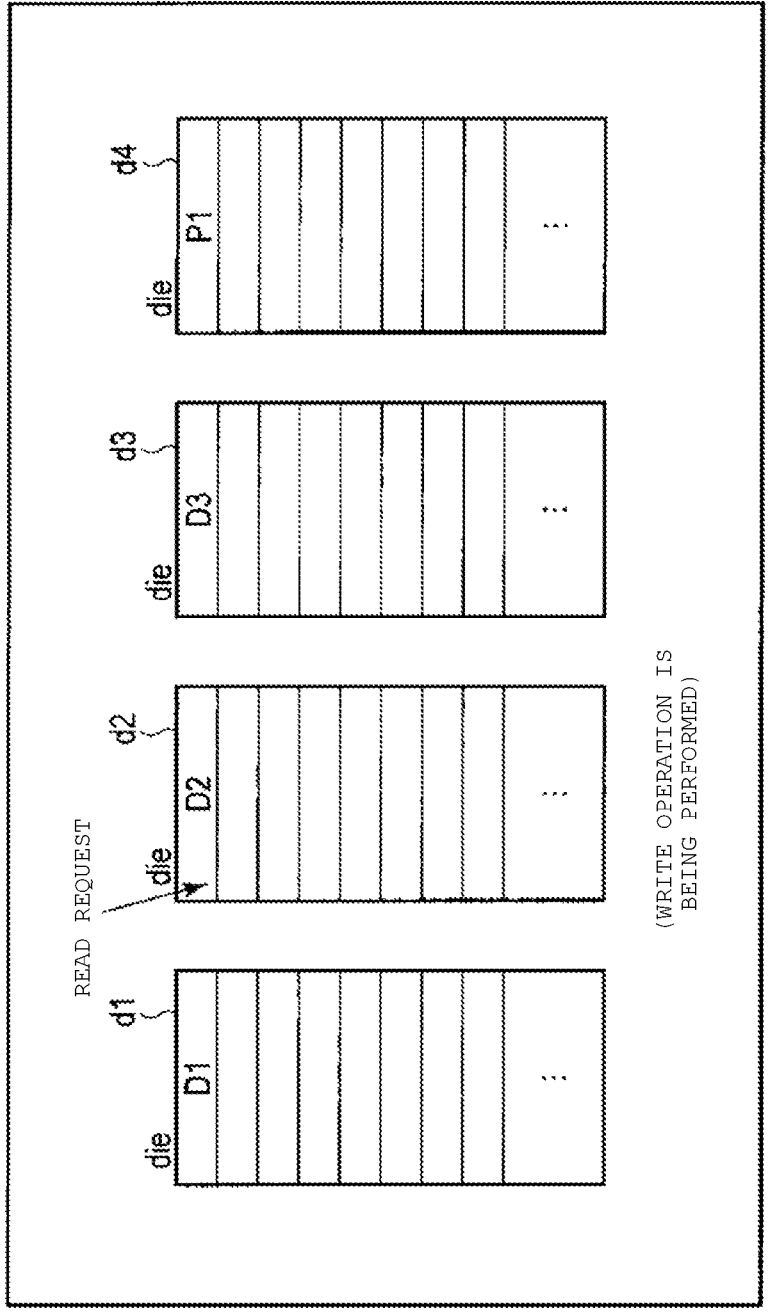
FIG. 3 is a diagram showing an example of a die collision where a read request is received for a die which is performing a write operation.

For example, a situation shown in FIG. 3 is considered.

In FIG. 3, one RAID group consists of four dies d1, d2, d3, and d4. Data items D1, D2, D3, and a parity P1 are stored in the dies d1, d2, d3, and d4 respectively. The data items D1, D2, D3, and the parity P1 are called a parity group.

A case where the die d2 is performing the write operation is considered now. In this case, it is assumed that a read request for the die d2 is received from the host 2. In order to read the data D2 from the die d2, it is necessary to wait for the write operation being performed by the die d2 to be completed.

Instead, the SSD 3 reads the data D1, the data D3, and the parity P1 from other dies d1, d3, and d4 without reading the data D2 from the die d2. The SSD 3 restores the data D2 from the data D1, the data D3, and the parity P1, and returns the restored data D2 to the host 2. Accordingly, tolerance to the die collision can increase.

Hereinafter, the number of actual data items included in one parity group is expressed by k, and the number of parities is expressed by m. For example, when one parity P1 is added to D1, D2, and D3, k is three, and m is one. The values of k and m are ideally integers of one or more. In general, k is an integer of two or more, and m is an integer of one or more.

In a parity group which has a (k+m) configuration including k data portions and m parities, it is possible to tolerate the loss of a maximum of m data portions. That is, within a certain parity group, it is possible to avoid the simultaneous occurrence of the die collision up to m times.

In the above-described example, a case where the die collision for the die d2 is avoided is illustrated. For example, when the die d2 and the die d3 each are performing the write operation, since the number of times of the die collisions exceeds m (in this example, one), the data D1 requested to be read is not able to be restored.

In a typical RAID, m is typically two or less like RAID6. However, if an erasure correction code like Reed-Solomon is used, an arbitrary m which is greater than two may be used.

In addition, there is a problem of capacity efficiency in the avoidance of the die collision using the parity.

That is, when the die collision occurs, restoring the desired data stored in the die in which the die collision occurs by reading data portion as few times as possible is attempted. To achieve this, k needs to have a small value. However, in one parity group having a (k+m) configuration, the number of data items capable of being used by a user is k, and the number of storage areas required in the SSD is (k+m). That is, capacity capable of being used by the user is capacity of SSD×(k/(k+m)). Thus, as k becomes smaller, the read latency becomes shorter, but a problem that capacity efficiency deteriorates occurs. Also, as m becomes larger, tolerance to the die collision increases, but the capacity efficiency deteriorates.

Thus, the SSD 3 according to the present embodiment has a function of causing the host 2 to designate any combination of k and m for each area within the SSD 3, and causing a plurality of areas (having different characteristics related to the capacity efficiency and the tolerance to the die collision) to coexist within the SSD 3. Hereinafter, this function is referred to as a RAID readable area control function. Herein, the term "the die collision avoidance readable areas using the parity" means storage areas to which a (k+m) RAID configuration is applied. Hereinafter, the die collision avoidance readable areas using the parity are also referred to as RAID readable areas.

The host 2 may dynamically designate an arbitrary (k+m) for one SSD 3, may select a plurality of (k+m) configurations, and may use the selected configurations. Accordingly, such a function to prioritize capacity efficiency for data for which die collision is not an issue, that is, for data for which tail latency to the read request is not an issue, and for other data for which read latency has been shortened as much as possible at the expense of capacity efficiency, can be realized in one SSD 3.

The RAID readable area control function can dynamically control the number m of parities by actively utilizing available capacity of the NAND flash memory 5.

In this case, the host 2 may designate a range (that is, a minimum number of m and a maximum number of m) such that m is three at the best case and m is one at the worst case for a certain k. For example, if the NAND flash memory 5 has available capacity to spare, the SSD 3 may adopt a combination of k=7 and m=3, that is, a (7+3) RAID configuration. As the available capacity decreases, the SSD 3 sequentially reduces a value of m by removing the parity from the NAND flash memory 5. For example, the (7+3) RAID configuration may be initially adopted, and the RAID configuration may be changed to a (7+2) configuration later. The RAID configuration may be changed to a (7+1) configuration later, or may be changed to a (7+0) configuration later.

As mentioned above, when the value of m within the parity group is reduced, that is, the parity already stored in the NAND flash memory 5 is removed, then, the available capacity of the NAND flash memory 5 can increase.

The SSD 3 may write the parity in the random-access memory (for example, DRAM 6) of the SSD 3.

In this case, the SSD 3 may store the parity to be removed from the NAND flash memory 5 in a parity cache within the DRAM 6. The parity cache is a storage area on the DRAM 6 for storing the parity as a cache. A time when the parity is stored in the parity cache is not limited, and may be, for example, a time when the parity is removed from the NAND flash memory 5, or may be a time when the die collision occurs in the parity group that includes the removed parity.

There is a high possibility that the data requested to be read once will be read again. Thus, if the die collision occurs in the parity group that includes the removed parity, the SSD 3 may re-calculate the removed parity in addition to restoring the data portion by using other data portions and the remaining parities of the parity group, and may store the re-calculated parity in the parity cache of the DRAM 6. Accordingly, the number m of parities of the parity group can increase without increasing the number of parities stored in the NAND flash memory 5. That is, the tolerance to the die collision of the parity group can increase.

For example, if a die that stores a data portion which is a reading target designated by a read request is performing a write process, the SSD 3 reads all the data portions and all the parities within the parity group except for the data portion which is the reading target and the removed parity from the NAND flash memory 5, and restores the data portion which is the reading target by using the read data portions and all the read parities of the parity group. The SSD 3 may re-calculate the removed parity by using the restored data portion which is the reading target and the read data portions of the parity group, and may store the re-calculated parity in the parity cache of the DRAM 6.

The SSD 3 also can receive a notification (e.g., hint) for predicting a reading target area from the host 2, and preferentially leave the parity of the reading target area in the NAND flash memory 5 or a cache area based on the notification.

The host 2 transmits the notification for predicting the reading target area to the SSD 3. The reading target area is an area that is highly likely to be designated by a subsequent read request. The host 2 may notify of one of the RAID readable areas as the reading target area, or may notify of a part of one of the RAID readable areas as the reading target area.

The reading target area may be designated by a logical address range. Alternatively, when area identifiers are assigned to the plurality of RAID readable areas, the reading target area may be designated by the area identifier. Alternatively, in a case where one RAID readable area includes one or more virtual blocks, the reading target area may be designated by the area identifier and a virtual block number. The virtual block number is a number unique within a certain RAID readable area and this unique number is used as an identifier. The virtual block indicates a set of a plurality of physical blocks.

When the host 2 transmits a hint that a certain RAID readable area is designated as the reading target area, the host 2 may perform a process for preferentially leaving the parity of the RAID readable area in the NAND flash memory 5 or the cache area. Also when the host 2 transmits a hint that a certain virtual block number within a certain RAID readable area is designated as the reading target area, the host 2 may perform a process for preferentially leaving the parity stored in a physical block set assigned to the virtual blocks of the RAID readable area in the NAND flash memory 5 or the cache area.

For example, when database software is run in the host 2, the database software specifies a storage position of desired data by referring to index data. Accordingly, if a certain index portion within the index data is referred to, an area that is highly likely to be requested to be read may be predicted from the referred index portion. The host 2 may notify the SSD 3 of the reading target area indicating the predicted area as a hint.

When the notification is received, the SSD 3 may perform a process for preferentially leaving the reading target area among the plurality of RAID readable areas of the NAND flash memory 5 in the NAND flash memory 5 or in the cache area. For example, when a certain virtual block number is designated as the reading target area, the SSD 3 may perform a process for preferentially leaving the parity of the parity group associated with the virtual block number in the NAND flash memory 5 or the cache area.

Alternatively, for example, while the SSD 3 is in an idle state, the SSD 3 may actively perform a process for re-calculating the parity of the parity group belonging to the reading target area, and may store the re-calculated parity in the cache area.

Whenever the parity is calculated (or re-calculated), the SSD 3 may notify the host 2 of the calculated (or re-calculated) parity and the identifier of the parity group to which the parity belongs.

The host 2 may store the parity and the identifier of the parity group notified from the SSD 3 in a parity cache on the random-access memory (DRAM) of the host 2. When a parity for a position of data to be read from now is present in the parity cache of the host 2, the host 2 may transmit a read request including the parity to the SSD 3.

Alternatively, when the parity is removed from the parity cache on the DRAM 6 of the SSD 3, the SSD 3 may notify the host 2 of the removed parity and the identifier of the parity group to which the removed parity belongs. The host 2 stores the parity and the identifier of the parity group notified from the SSD 3 in the parity cache on the random-access memory (DRAM) of the host 2. When a parity for a position of data to be read from now is present in the parity cache of the host 2, the host 2 may transmit a read request including the parity to the SSD 3. A size of the parity cache of the host 2 is typically greater than a size of the parity cache of the SSD 3. Accordingly, it is possible to effectively utilize the parity without losing the parity by notifying the host 2 of the parity to be removed from the parity cache of the SSD 3.

The SSD 3 may limit the number of dies which are performing the write or erase process during some time periods. Specifically, the SSD 3 limits the number of times of the write operations being simultaneously performed on a plurality of dies assigned to a certain RAID readable areas such that the number of times of the write operations is equal to or less than the number m of parities of the RAID readable areas by scheduling timings when the write requests received from the host 2 are performed. Accordingly, it is possible to set the number of times of the die collisions that are likely to simultaneously occur in the RAID readable area to be equal to or less than the number of times of avoidable die collisions by m parities of the RAID readable area.

For example, the SSD 3 may have capabilities to calculate various kinds of parities such as XOR parity, P parity/Q parity (P+Q) in the RAID 6, and Reed Solomon. The SSD 3 may use Local Reconstruction Codes (LRC) as the parity, and may use a two-dimensional parity configuration in addition to a one-dimensional parity configuration.

The host 2 may designate a parity calculation method (XOR parity, P parity/Q parity (P+Q), or Reed Solomon) to be used based on a workload of the host 2 in addition to dynamically designating an arbitrary (k+m) for the SSD 3. Similarly, the host 2 may designate a parity configuration (e.g., one-dimensional parity, two-dimensional parity, or Local Reconstruction Codes (LRC)) to be used based on a workload of the host 2 in addition to dynamically designate an arbitrary (k+m) for the SSD 3.

Hereinafter, a configuration of the controller 4 will be described with reference to FIG. 1.

The controller 4 is electrically connected to the plurality of NAND flash memory dies through the plurality of channels (for example, eight channels). The controller 4 controls the NAND flash memory 5 that includes the plurality of NAND flash memory dies.

The SSD 3 may be realized as an SSD type on the assumption that the SSD is allowed for random access to data by using a logical address such as a logical block address (LBA) (hereinafter, referred to as a conventional SSD), or may be realized as an SSD type on the assumption that continuous data items from the host 2 are sequentially written in the physical block set called the virtual blocks (hereinafter, referred to as a non-conventional SSD).

When the SSD 3 is realized as the conventional SSD, the controller 4 may function as a flash translation layer (FTL) configured such that the data management of the NAND flash memory 5 is able to be performed. The FTL is used in a case where the host 2 accesses the SSD 3 by using the logical address such as the logical block address (LBA).

The data management performed by the FTL includes (1) a management of mapping information indicating a correspondence between the logical addresses and the physical addresses of the NAND flash memory 5, and (2) a process for concealing the read and write operations on the page basis and the erasing operation on the block basis. The logical address is an address used by the host in order to designate the address of the SSD 3. The logical block address (LBA) is typically used as the logical address. In the following description, the logical address is assumed to be the logical block address (LBA).

The management of the mapping of the logical block addresses (LBAs) and the physical addresses is performed by using a lookup table (LUT) 32 functioning as an address conversion table (e.g., logical-to-physical address conversion table). The controller 4 manages the mapping of the LBAs and the physical addresses based on a predetermined management size unit by using the LUT 32. The management size unit is not limited, and may be, for example, 4 kB. The address conversion table (LUT 32) may be loaded into the DRAM 6 from the NAND flash memory 5 when the SSD 3 is powered on.

A physical address corresponding to a certain LBA indicates a physical storage position within the NAND flash memory 5 in which the data related to the LBA is written. For example, the physical address may be expressed by a die number, a physical block number, and a page number.

When the SSD 3 is realized as the non-conventional SSD, the controller 4 may control the NAND flash memory 5 based not on the LBA but on another type of SSD address (for example, an area identifier, a virtual block number, and a page number within the virtual block) received from the host 2.

The controller 4 may include a host interface 11, a CPU 12, the NAND interface 13, and a DRAM interface 14. The CPU 12, the NAND interface 13, and the DRAM interface 14 are connected to each other through a bus 10.

The host interface 11 receives various commands (for example, a write command, a read command, an erase command, and an UNMAP/Trim command) from the host 2.

The CPU 12 is a processor configured to control the host interface 11, the NAND interface 13, and the DRAM interface 14. The CPU 12 loads a control program (e.g., firmware) stored in a ROM (not shown) or the NAND flash memory 5 onto the DRAM 6 of the powered-on of the SSD 3, and performs predetermined processes. For example, the CPU 12 may perform a command process for processing various commands from the host 2 in addition to the FTL process. An operation of the CPU 12 is controlled by the firmware executed by the CPU 12. A part or all of the FTL process and the command process may be performed by dedicated hardware within the controller 4.

In one embodiment, the CPU 12 is programmed by the firmware to function as a write operation control unit 21, a read operation control unit 22, and a RAID readable area control unit 23.

The write operation control unit 21 receives write data from the host 2 in response to a reception of a write request (e.g., write command) from the host 2. The write operation control unit 21 writes the write data to the NAND flash memory 5. In response to a reception of a read request (e.g., read command) from the host 2, the read operation control unit 22 reads data designated by the read command from the NAND flash memory 5. The read operation control unit 22 returns the read data to the host 2.

The RAID readable area control unit 23 performs the RAID readable area control function.

The RAID readable area control unit 23 receives a request for designating the number of parities and the number of data portions constituting one parity group of the RAID for each logical area (e.g., for each RAID readable area) within the NAND flash memory 5 from the host 2. The RAID readable area control unit 23 manages, as a parameter indicating the RAID configuration of the area, a combination of k and m indicating the number of data items and the number of parities corresponding to the area for each RAID readable area. Now, it is assumed that the RAID readable area control unit 23 manages a combination of k and m indicating the number of data items and the number of parities corresponding to a certain RAID readable area (such as logical area #1) within the NAND flash memory 5 and a combination of k' and m' indicating the number of data items and the number of parities corresponding to another RAID readable area within the NAND flash memory 5 (such as logical area #n). The combination of k' and m' is different from the combination of k and m.

In this case, the RAID readable area control unit 23 writes k data portions received from the host 2 and m parities calculated from the k data portions over (k+m) physical blocks selected from (k+m) different dies one by one based on the write request from the host 2 for the area #1. Accordingly, the write data from the host 2 can be stored as the parity group including k data portions and m parities in the NAND flash memory 5, and thus, it is possible to avoid the die collisions up to m times.

The RAID readable area control unit 23 writes k' data portions received from the host 2 and m' parities calculated from the k' data portions over (k'+m') physical blocks selected from (k'+m') different dies one by one based on the write request from the host 2 for the area #n. Accordingly, the write data from the host 2 can be stored as the parity group including k' data portions and m' parities in the NAND flash memory 5, and thus, it is possible to avoid the die collisions up to m' times.

Figure 4:
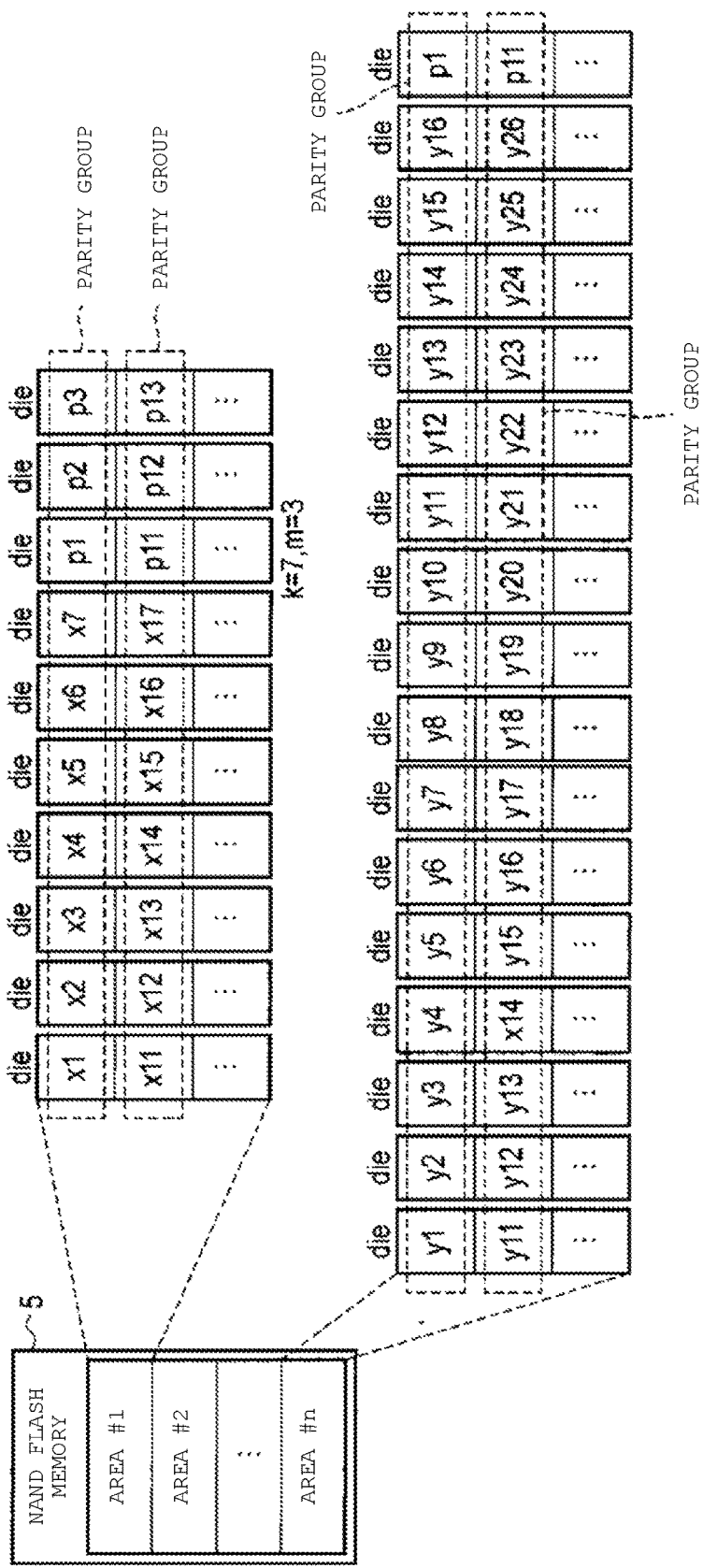
FIG. 4 is a diagram showing an example of a RAID configuration having areas that are managed and controlled by the memory system according to the embodiment.

An example of the write operation is illustrated in FIG. 4. In FIG. 4, a case where k=7 and m=3 are applied in the area #1 and k=16 and m=1 are applied in the area #n is illustrated.

For example, in the area #1, seven data portions x1, x2, x3, x4, x5, x6, and x7 and three parities p1, p2, and p3 are distributed in ten different dies. Seven data portions x1, x2, x3, x4, x5, x6, and x7 and three parities p1, p2, and p3 constitute one parity group. It is possible to avoid the simultaneous occurrence of the die collisions up to three times in the (7+3) parity group.

For example, in the area #n, 16 data portions y1, y2, y3, y4, y5, y6, y7, y8, y9, y10, y11, y12, y13, y14, y15, and y16 and one parity p1 are distributed in 17 different dies. 16 data portions y1, y2, y3, y4, y5, y6, y7, y8, y9, y10, y11, y12, y13, y14, y15, an y16 and one parity p1 constitute one parity group. The number of times of the avoidable die collisions is only one in the (16+1) parity group, but capacity efficiency is higher than that of each parity group of the area #1.

The NAND interface 13 in FIG. 1 is a NAND controller that controls the NAND flash memory 5. The DRAM interface 14 is a DRAM controller that controls access to the DRAM 6. A storage area of the DRAM 6 is utilized in order to function as a write buffer (WB) 31, and to store a lookup table (LUT) 32 and system management information 33. The system management information 33 includes various management information items required in the RAID readable area control function.

Hereinafter, a configuration of the host 2 will be described.

The host 2 is an information processing device that executes various programs. The program executed by the information processing device includes an application software layer 41, an operating system (OS) 42, and a file system 43.

As is generally known, the operating system (OS) 42 is software that is configured to manage the overall host 2, control hardware within the host 2, and control an application to use the hardware and the SSD 3.

The file system 43 is used for controlling operations (such as creating, storing, updating, and removing) of a file. For example, ZFS, Btrfs, XFS, ext4, and NTFS may be used as the file system 43. Alternatively, a file object system (for example, Ceph Object Storage Daemon), Key Value Store system (for example, Rocks DB) may be used as the file system 43.

Various application software threads are run on the application software layer 41. As an example of the application software thread, there are client software, database software, and a virtual machine.

When it is necessary for the application software layer 41 to send a request such as the read command or the write command to the SSD 3, the application software layer 41 sends the request to the OS 42. The OS 42 sends the request to the file system 43. The file system 43 translates the request to the command (e.g., the read command or the write command). The file system 43 sends the command to the SSD 3. When a reply from the SSD 3 is received, the file system 43 sends the reply to the OS 42. The OS 42 sends the reply to the application software layer 41.

The file system 43 may include a RAID parameter designation unit 43A, and a parity cache management unit 43B. The RAID parameter designation unit 43A is a program module for designating RAID parameters, k and m, for each area. A user such as an administrator of a data center may designate any combination of k+m for any area if necessary by operating the RAID parameter designation unit 43A of the host 2 from a terminal. The parity cache management unit 43B is a program module for managing the parity cache within the host 2. The RAID parameter designation unit 43A and the parity cache management unit 43B may not be necessarily present within the file system 43, and may be present, for example, within the OS 42 or may be present within the application on the application software layer 41.

FIG. 5 shows an area management table 33A.

The area management table 33A is a part of the system management information 33, and manages the combination of k and m corresponding to each RAID readable area. For example, in a case where the area #1 is used as the RAID readable area in which the read latency is preferentially shortened and the area #2 is used as the RAID readable area in which the capacity efficiency is considered in preference to the read latency, a ratio of k2 to (k2+m2) may be set to be higher than a ratio of k1 to (k1+m1). The values of k1, k2, m1, and m2 may have the following relationship:

k1 and k2 are integers of 2 or more;

m1 is an integer of 1 or more; and m2 is an integer which is smaller than m1 and is equal to or greater than 0.

When m2 is 0, the parity is not stored in the area #2, and the area #2 functions as RAID0.

FIG. 6 shows structure information 33B of the NAND flash memory 5.

The structure information 33B of the NAND flash memory 5 is a part of the system management information 33, and includes a page size, a block size, and an SSD capacity. The block size indicates a size of one physical block. The structure information 33B of the NAND flash memory 5 may further include a virtual block size. The controller 4 may report the structure information to the host 2 in response to a request from the host 2.

FIG. 7 shows a virtual block management table 33C.

The virtual block management table 33C is a part of the system management information 33, and is used for managing the physical block set allocated to each virtual block when the SSD 3 is realized as the non-conventional SSD. For the sake of convenience in the description, the area identifier is omitted in FIG. 7, but the physical block set may be actually managed for each combination of the area identifier and the virtual block number (hereinafter, referred to as a virtual block id).

The virtual block management table 33C includes a plurality of entries. Each entry includes a "virtual block id (vid)" field, a "set of data physical blocks" field, and a "set of parity physical blocks" field. The "set of data physical blocks" field indicates an identifier for specifying each physical block to be used for storing the data, that is, a combination of the die number and the physical block number. The "set of parity physical blocks" field indicates an identifier for specifying each physical block to be used for storing the parity, for example, a combination of the die number and the physical block number.

Figure 8:
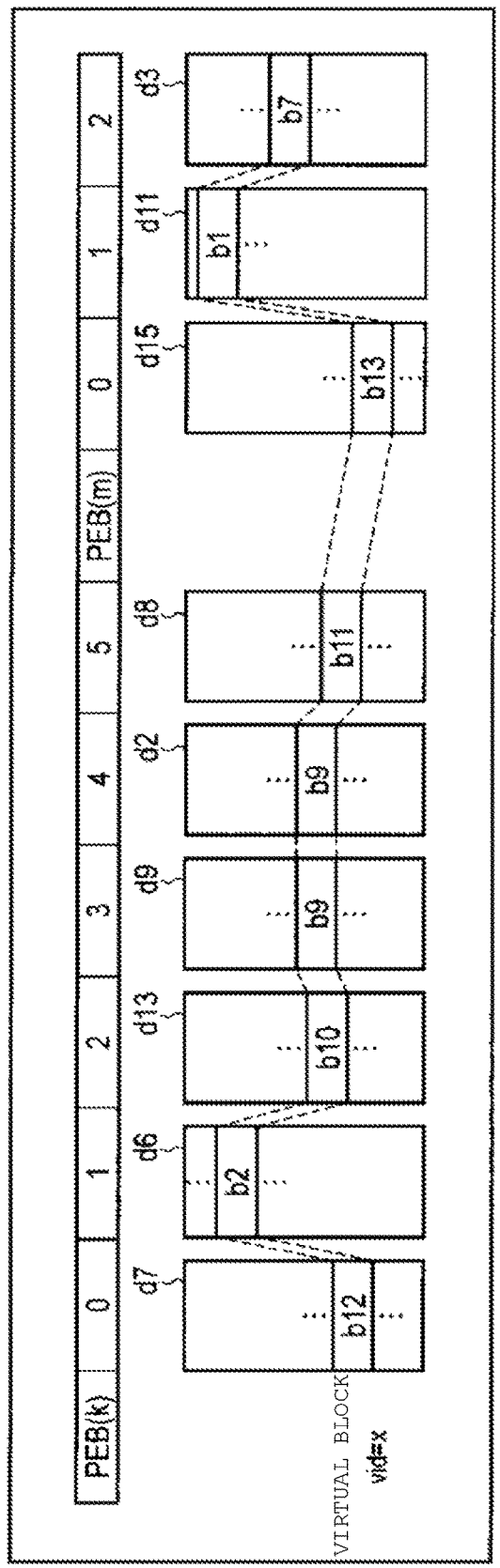
FIG. 8 is a diagram showing an example of a set of data physical blocks and a set of parity physical blocks allocated to a certain virtual block.

FIG. 8 shows an example of a physical block set for data and a physical block set for parity which are allocated to a certain virtual block (vid=x) within a certain RAID readable area. In this example, it is assumed that k=6 and m=3.

Within the SSD 3, the physical block (physical erase block: PEB) may be identified by (die number, block number). The block number is a number unique within a certain die. The virtual block may be identified by the virtual block number (referred to as the virtual block id (vid)). The virtual block id, vid, is a number unique within a certain RAID readable area. Hereinafter, die number 1 is described as d1 and block number 1 is described as b1.

Six first to sixth physical blocks PEB (k) and three first to third physical blocks PEB (m) are allocated to the virtual block (vid=x) of a certain RAID readable area. Six physical blocks PEB (k) are physical blocks for data of the virtual block (vid=x). Three physical blocks PEB(m) are physical blocks for parity of the virtual block (vid=x).

Nine physical blocks (PEB (k), PEB (m)) are selected from nine different dies one by one. The following cases are assumed as in FIG. 8.

(1) A physical block b12 of a die d7 (d7, b12) is allocated as a first data physical block (PEB (k)=0).

(2) A physical block b2 of a die d6 (d6, b2) is allocated as a second data physical block PEB (PEB (k)=1).

(3) A physical block b10 of a die d13 (d13, b10) is allocated as a third data physical block (PEB (k)=2).

(4) A physical block b9 of a die d9 (d9, b9) is allocated as a fourth data physical block (PEB (k)=3).

(5) A physical block b9 of a die d2 (d2, b9) is allocated as a fifth data physical block (PEB (k)=4).

(6) A physical block b11 of a die d8 (d8, b11) is allocated as a sixth data physical block (PEB (k)=5).

(7) A physical block b13 of a die d15 (d15, b13) is allocated as a first parity physical block (PEB (m)=0).

(8) A physical block b1 of a die d11 (d11, b1) is allocated as a second parity physical block (PEB (m)=1).

(9) A physical block b7 of a die d3 (d3, b7) is allocated as a third parity physical block (PEB (m)=2).

One RAID readable area may include a plurality of virtual block ids (vids). In this case, the same die set may be allocated to each virtual block id (vid) within the same RAID readable area. Different physical blocks of each die may be allocated to these virtual block ids (vids).

Hereinafter, a specific example of the RAID readable area control function will be described.

The host 2 may designate the RAID readable area. The RAID readable area means a logical area to which the parity group of the RAID is applied. Several methods for designating the RAID readable area are described below.

A first method logically divides the storage area of the NAND flash memory 5 of the SSD 3 into a plurality of areas in advance and at least one of the areas is designated as the RAID readable area.

A plurality of namespaces may be used in order to logically divide the storage area of the NAND flash memory 5 into the plurality of areas. In this case, like a namespace function in NVMe, the capacity of the NAND flash memory 5 may be divided by a plurality of namespaces (sometimes more generally referred to herein as "areas"), or the capacity of the NAND flash memory 5 may be shared between the namespaces.

The host 2 may request that the SSD 3 create the namespace, and may designate a RAID configuration (k, m) to be applied to the namespace. The controller 4 of the SSD 3 notifies the host 2 of an identifier (NSID#1) of the created namespace, and manages the RAID configuration (k, m) corresponding to the namespace. That is, the controller 4 manages the namespace of NSID#1 as an area to which the parity group including k data portions and m parities is applied.

When the controller 4 receives a write request designating NSID#1 from the host 2, the controller 4 writes k data portions received from the host 2 and m parities calculated from the k data portions over (k+m) physical blocks. The (k+m) physical blocks are physical blocks selected from each of (k+m) different non-volatile memory dies. When m=0, the RAID reading is not used in this namespace. That is, the namespace does not have the parity area.

Alternatively, the host 2 may designate k, min_m, and max_m to be applied to the namespace. Here, min_m indicates a minimum value of m, and max_m indicates a maximum value of m. When the available capacity of the SSD 3 is sufficient, the controller 4 writes parities that are equal in number to max_m. As the available capacity of the SSD 3 decreases, the controller 4 may reduce the number of parities to be written to min_m.

A second method is a method capable of being applied to the non-conventional SSD on the assumption that the continuous data items from the host 2 are sequentially written in a physical block set called the virtual block. This case assumes that the controller 4 of the SSD 3 groups the plurality of physical blocks PEB into one large write area, and provides the large write area as one virtual block VB to the host 2. As described above, the virtual block VB is able to be identified by the virtual block number (vid), and vid is a number unique within a certain area (e.g., a certain RAID readable area).

Figure 9:
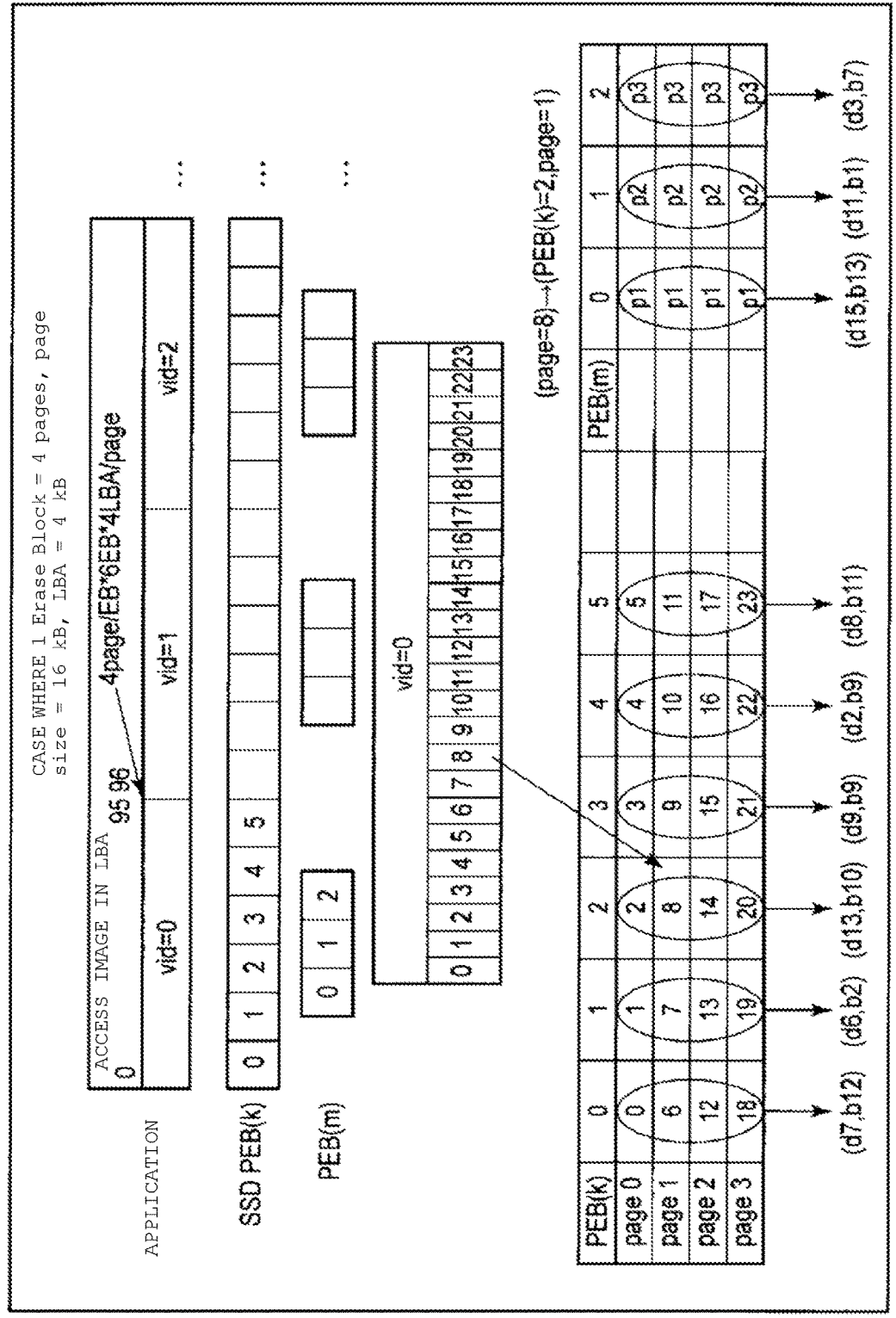
FIG. 9 is a diagram for describing a virtual block access operation performed by the memory system according to the embodiment.

FIG. 9 shows an outline of a virtual block access operation performed by using the virtual block number (vid).

In this example, it is assumed that one physical block includes four pages, a page size is 16 kB, and one LBA corresponds to 4 kB.

In the host 2, it is assumed that an LBA range of the SSD 3 includes several continuous virtual blocks (vid=0, vid=1, vid=2, ... ).

The SSD 3 may have a relationship between the virtual block and the logical address of the SSD 3 such as LBA. The relationship may be expressed, for example, as a dynamic conversion table, or may be simply acquired from vid through calculation. As an example to acquire the relationship by the calculation, since one virtual block includes six physical erase blocks in this example, vid 1 may be configured such that a first value thereof is 1×6×4×(16/4)=96 and the subsequent values are 97, 98, ... for every 4 kB. In the SSD 3, several data physical blocks PEB (k) are allocated to each virtual block of a certain RAID readable area. Several parity physical blocks PEB (m) are allocated to each virtual block. In FIG. 9, an example in which six data physical blocks PEB (k) and three parity physical blocks PEB (m) are allocated to each virtual block is illustrated.

The host 2 (for example, an application executed on the host 2) recognizes each virtual block as a large write area including 24 pages (=4×6). A writing destination position within the virtual block is identified by the virtual block number (vid) and the page number (page number within the virtual block).

When the host 2 requests that data is to be written in page=0 of vid=0, the data is written in an initial page (page 0) of a first data physical block (PEB (k)=0). When the host 2 requests that data is to be written in page=1 of vid=0, the data is written in an initial page (page 0) of a second data physical block (PEB (k)=1) through striping. When the host 2 requests that data is to be written in page=2 of vid=0, the data is written in an initial page (page 0) of a third data physical block (PEB (k)=2).

Similarly, for example, when the host 2 requests that data is to be written in page=8 of vid=0, the data is written in a second page (page 1) of a third data physical block (PEB (k)=2).

In this example, the striping is performed on a page basis. The striping does not need to be performed on a page basis, and the striping may be performed on any data length basis. For example, the page may be divided for every 4 kB, and the striping may be performed on data for every 4 kB (such that the data per 4 kB is distributed to the plurality of dies).

The controller 4 of the SSD 3 manages the physical positions (die number, physical block number) of the physical blocks PEB allocated to each virtual block number vid. In FIG. 9, an example in which (d7, b12), (d6, b2), (d13, b10), (d9, b9), (d2, b9), and (d8, b11) are allocated as six data physical blocks PEB (k) and (d15, b13), (d11, b1), and (d3, b7) are allocated as three parity physical blocks PEB (m) is illustrated.

Hereinafter, a procedure of virtual block access operations will be described.

(1) The host 2 adds parameters for RAID reading to the SSD 3 in order to request the RAID readable area at the SSD 3. For example, the host transmits a parity allocation request (k=6, min_m=1, max_m=3) for requesting the RAID readable area to the SSD 3. In this example, k, min_m and max_m indicate k, a minimum value of m, and a maximum value of m respectively. If min_m and max_m are 0, RAID reading is not performed in the RAID readable area, that is, there is no parity area.

(2) The controller 4 of the SSD 3 updates the area management table 33A as shown in FIG. 10, and assigns an identifier (hereinafter, referred to as area identifier rid) of a RAID readable area to parameters. The controller 4 returns a reply including the area identifier rid (for example, rid=1) to the host 2 to notify the host 2 of rid=1. Subsequently, the host 2 may specify the RAID readable area by using rid=1. For example, when the host 2 is necessary to transmit the write request for the RAID readable area to the SSD 3, the host 2 designates rid=1 and the writing destination position within the area corresponding to rid=1. The writing destination position is identified by the virtual block number (vid) and the page number within the virtual block.

(3) Now, it is assumed that the host 2 writes data items in pages in sequence from an initial page of vid=12 of rid=1. The host 2 transmits the write request (rid=1, vid=12, page=0) to the SSD 3. rid=1 indicates an area of the writing destination, vid=12 indicates a writing destination virtual block within the area of the writing destination, and page=0 indicates a page number within the virtual block. The write request may further include a data length of data to be written.

(4) The controller 4 of the SSD 3 allocates k (k=6 in this example) data physical blocks and m (min_m=1 and max_m=3 in this example) physical blocks to a virtual block of rid=1 and vid=12. In this case, the physical blocks are selected from different dies one by one.

In this example, it is assumed that the NAND flash memory 5 currently has available capacity to spare. In this case, since the parity physical blocks are allocated up to max_m, a total of nine physical blocks is allocated to a virtual block of rid=1 and vid=12.

In this example, it is assumed that (d7, b12), (d6, b2), (d13, b10), (d9, b9), (d2, b9), and (d8, b11) are allocated to k and (d15, b13), (d11, b1), and (d3, b7) are allocated to m. In this case, the controller 4 of the SSD 3 updates the virtual block management table 33C as shown in FIG. 11, and manages six data physical blocks, that is, (d7, b12), (d6, b2), (d13, b10), (d9, b9), (d2, b9), and (d8, b11) which are allocated to vid=12 of rid=1 and three parity physical blocks, that is, (d15, b13), (d11, b1), and (d3, b7) which are allocated to vid=12 of rid=1.

Figure 13:
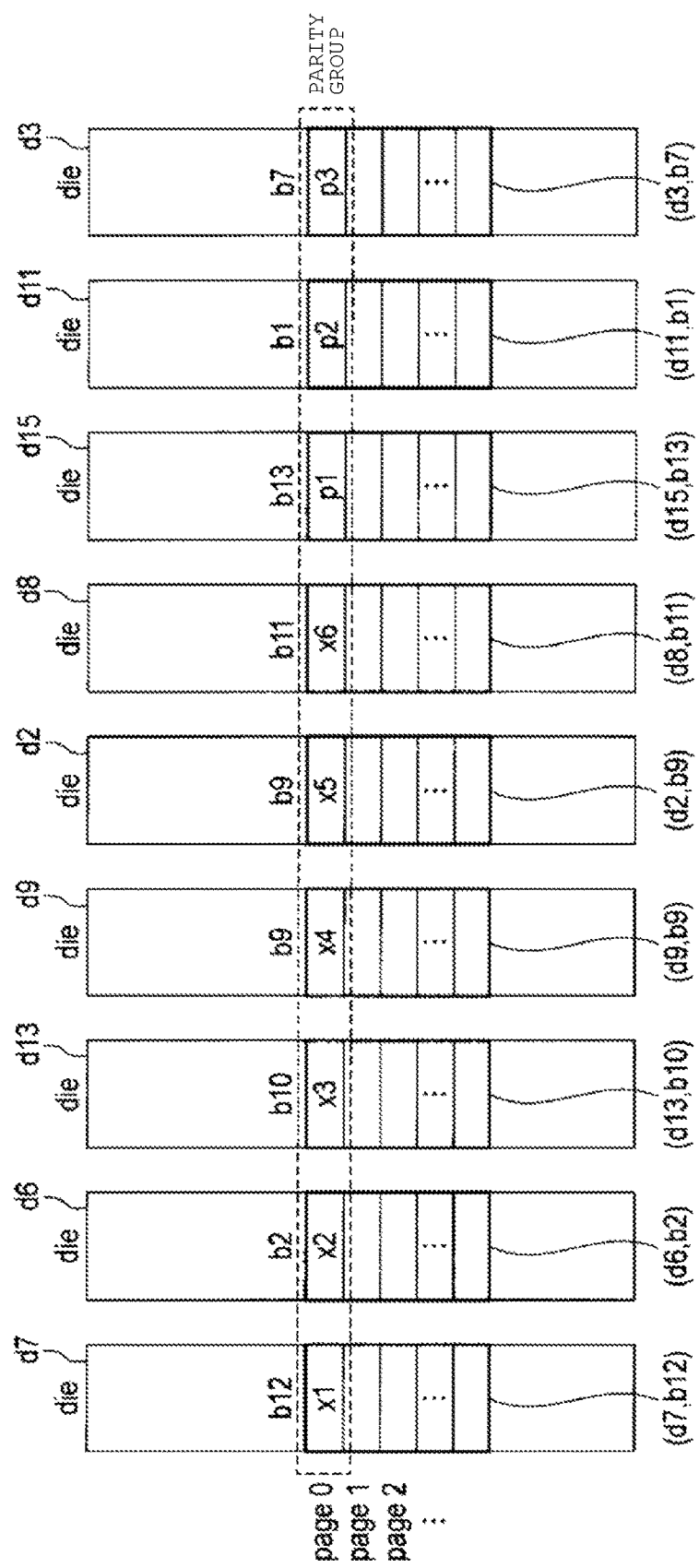
FIG. 13 is a diagram showing a case where the plurality of physical blocks allocated to one virtual block is selected from different dies one by one.

(5) It is assumed that the host 2 writes data items (data portion x1, data portion x2, data portion x3, data portion x4, data portion x5, and data portion x6) in six pages of the NAND flash memory 5. In this example, it is assumed that the data portions are written in sequence from a page (page 0) within an initial virtual block of vid=12 of rid=1. When p1, p2, and p3 are parity data items, (x1, x2, x3, x4, x5, x6, p1, p2, and p3) are written in the NAND flash memory 5 in a form shown in FIG. 12. FIG. 13 is a diagram for describing a case in FIG. 12. The data x1 is written in an initial page (page 0) of a physical block b12 of a die d7. The data x2 is written in an initial page (page 0) of a physical block b2 of a die d6. The data x3 is written in an initial page (page 0) of a physical block b10 of a die d13. The data x4 is written in an initial page (page 0) of a physical block b9 of a die d9. The data x5 is written in an initial page (page 0) of a physical block b9 of a die d2. The data x6 is written in an initial page (page 0) of a physical block b11 of a die d8. The parity p1 is written in an initial page (page 0) of a physical block b13 of a die d15. The parity p2 is written in an initial page (page 0) of a physical block b1 of a die d11. The parity p3 is written in an initial page (page 0) of a physical block b7 of a die d3.

As described above, a set of data items and parities such as (x1, x2, x3, x4, x5, x6, p1, p2, p3) is referred to as a parity group.

In this example, it is assumed that the host 2 recognizes the page size of the SSD 3, the SSD address is indicated by (rid, vid, page number within virtual block), and the SSD 3 converts the SSD address into (rid, vid, physical block number, page number within physical block).

Figure 14:
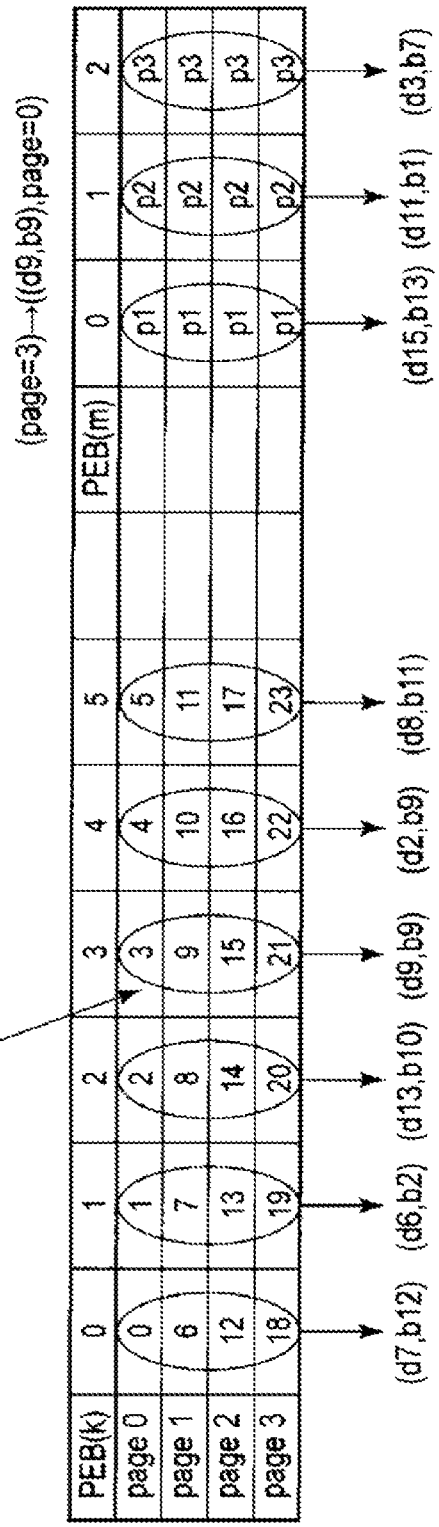
FIG. 14 is a diagram for describing the virtual block access operation performed by the memory system according to the embodiment.

For example, as shown in FIG. 14, (rid=1, vid=12, page=3) is converted into (rid=1, vid=12, (d9, b9), page=0). The conversion may be performed through calculation, and may share a conversion table by the SSD 3 and the host 2.

(6) In this example, it is assumed that a write request for another physical block other than the physical block b12 of the die d7 occurs. In the die d7, a write operation corresponding to the write request is performed. It is assumed that a read request for designating the SSD address (d7, b12, page=0), that is, a read request for the data x1 is received from the host 2 for a period during which the write operation is being performed. As shown in FIGS. 12 and 13, the data x1 is stored in (d7, b12, page=0). In this case, the controller 4 of the SSD 3 may recognize that the die collision occurs in the die d7. Thus, the controller 4 of the SSD 3 does not read data from (d7, b12, page=0), but reads x2, x3, x4, x5, x6, and p1 by referring to the information of the virtual block management table 33C, and restores x1 from x2, x3, x4, x5, x6, and p1 (RAID reading). Of course, in this case, the controller 4 may read any of six of (x2, x3, x4, x5, x6, p1, p2, and p3).

Hereinafter, still another method for logically dividing the storage area of the NAND flash memory 5 into a plurality of areas will be described. In the following description, a method capable of being applied to the conventional SSD that uses the logical address such as LBA as the SSD address will be described.

The host 2 may designate any logical address within the overall logical address range of the SSD 3, as a RAID readable area. The host 2 may designate a logical address range to be used as the RAID readable area and a RAID configuration (k, m) to be applied to the logical address range.

In this case, the host 2 may send the following area request to the SSD 3:

Area request (start=4000, length=1000, k=8, min_m=1, max_m=3)

In this example, start indicates a start SSD address (start logical address) of the RAID readable area; length indicates a length of the area; and k, min_m, and max_m indicate k, a minimum value of m, and a maximum value of m.

In this case, if the area in which the parity is stored is not able to be allocated within the SSD 3, the controller 4 of the SSD 3 may return an error to the host 2. The controller 4 of the SSD 3 performs the same management as that in the above-described example, and performs a RAID read process if necessary.

Alternatively, the host 2 may designate both an area of actual data (k) and an area of parity data (m):

Area request (start=8000, length=800, k=8, min_m=1, max_m=3, parity_start=16000, parity_length=100)

In this example, start indicates a start SSD address (start logical address) of the RAID readable area; length indicates a length of the area; k, min_m, and max_m indicate k, a minimum value of m, and a maximum value of m; parity_start indicates a start SSD address of an area in which a parity to be used in the RAID reading is stored; and parity_length indicates a length of the area. The SSD 3 may reject a write request for a section from parity_start to parity_length until the area is released. The SSD may return an actual parity value or may return a certain constant value or a random value in the reading of data in a section from parity_start to parity_length, or may reject the reading of data in the section from parity_start to parity_length.

For example, the controller 4 manages the RAID configuration (k, m) corresponding to each logical address range for each logical address range designated by the area request. When the controller 4 receives a write request for designating a certain logical address as a writing destination from the host 2, the controller 4 determines the RAID configuration (k, m) corresponding to the logical address range to which the logical address of the writing destination belongs. The controller 4 writes k data portions received from the host 2 and m parities calculated from the k data portions over (k+m) physical blocks based on the determined RAID configuration (k, m).

Figure 15:
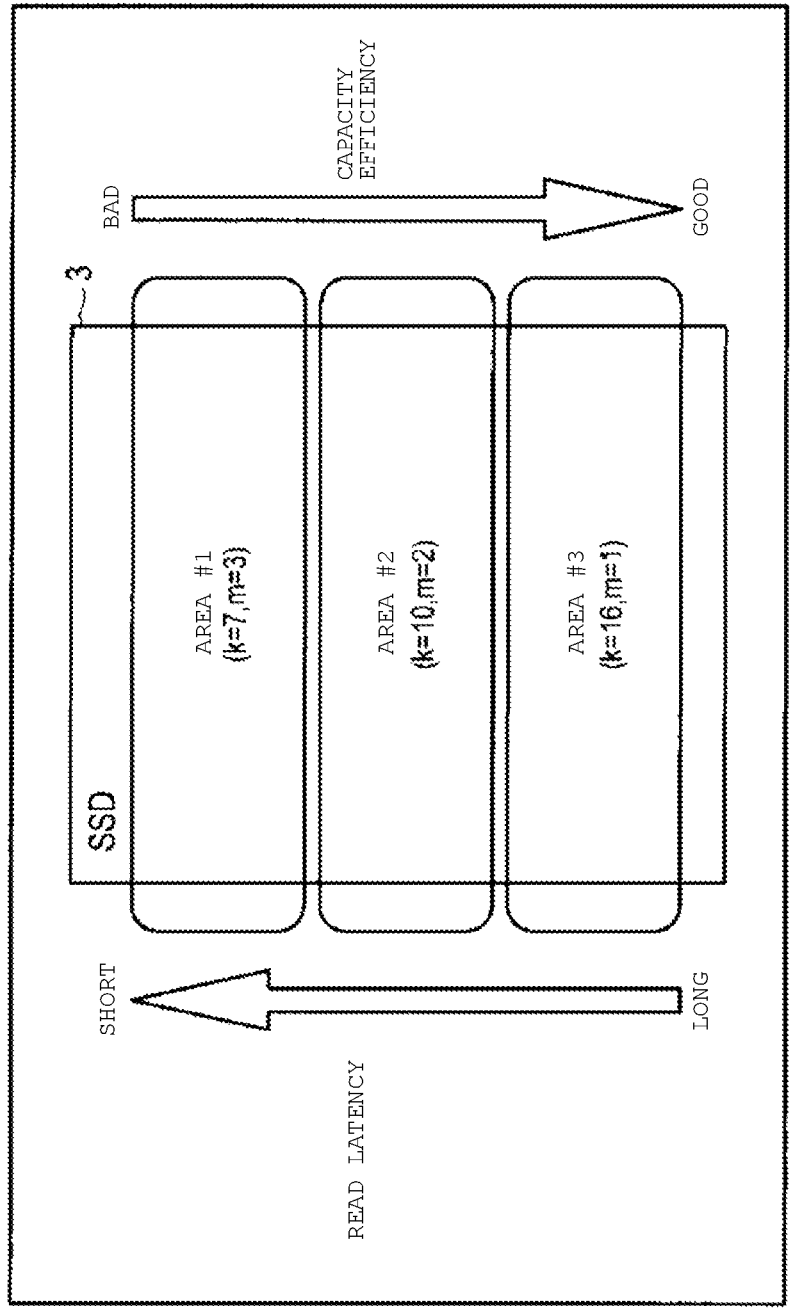
FIG. 15 is a diagram showing the relationship between read latency and capacity efficiency in different areas managed by the memory system according to the embodiment.

FIG. 15 shows the relationship between the area, the read latency, and the capacity efficiency of the SSD 3.

In this example, it is assumed that the storage area of the NAND flash memory 5 is logically divided into three areas #1, #2, and #3 in which combinations of k and m are different from each other. For example, a RAID configuration of which k=7 and m=3 is applied to the area #1, a RAID configuration of which k=10 and m=2 is applied to the area #2, and a RAID configuration of which k=16 and m=1 is applied to the area #3. In this case, the area #1 has the highest tolerance to the die collision though having the low capacity efficiency, and the area #3 has the highest capacity efficiency though having the low tolerance to the die collision. Thus, the data written in the area #1 may be read with the shortest read latency. Accordingly, the host 2 can use one SSD as multiple kinds of storages having different characteristics by setting the RAID configuration (k, m) corresponding to the purpose of the area to each area.

Figure 16:
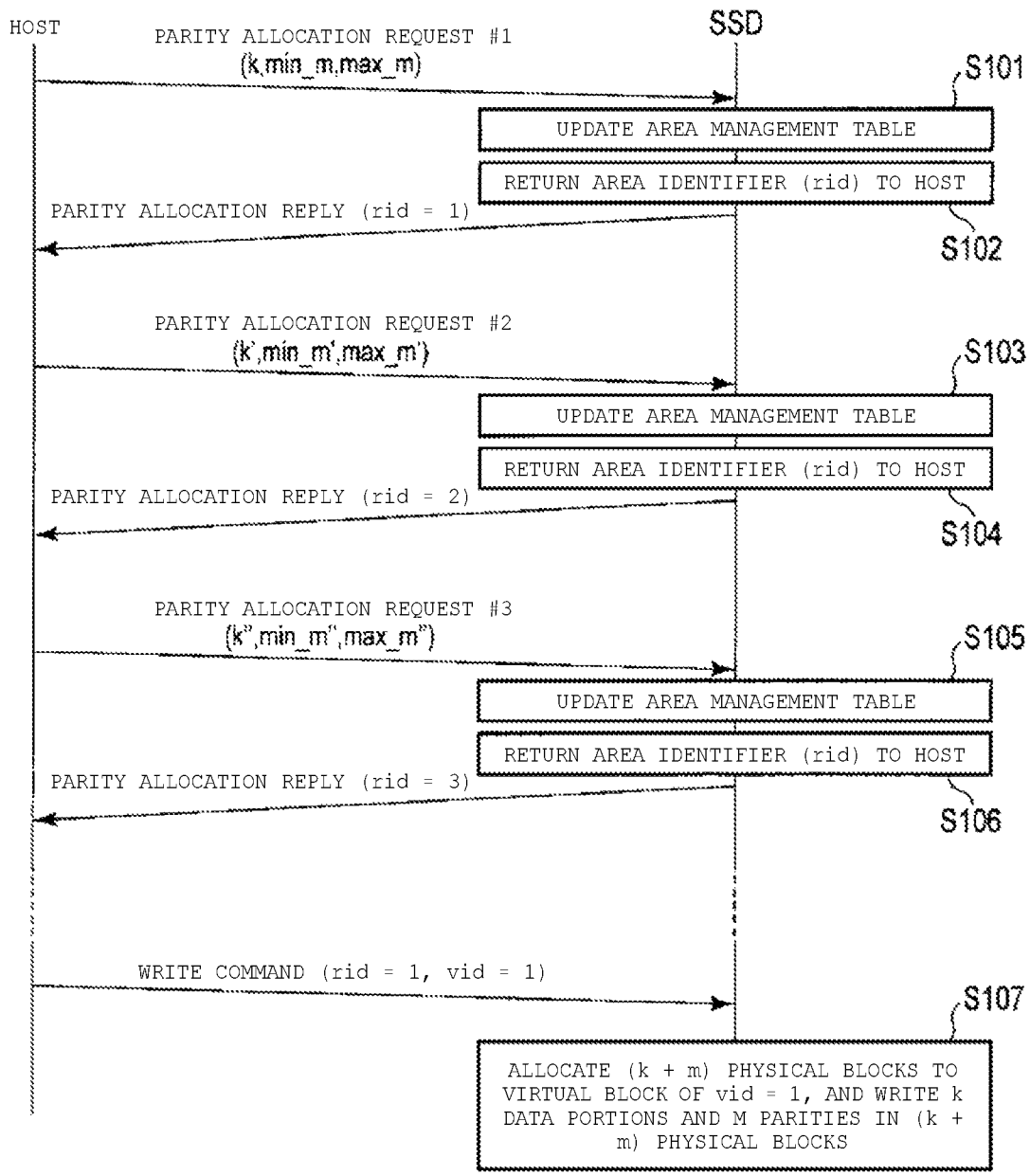
FIG. 16 is a diagram showing a process sequence of an area designation process and a write process performed by the memory system according to the embodiment.

FIG. 16 shows a data write process sequence performed by the SSD 3.

The controller 4 of the SSD 3 updates the area management table 33A based on a parity allocation request #1 received from the host 2 (step S101). In step S101, the controller 4 assigns an area identifier (rid=1) to parameters (k, min_m, and max_m) included in the parity allocation request #1, and registers rid=1, k, min_m, and max_m in the area management table 33A. Subsequently, the controller 4 returns the area identifier (rid=1) to the host 2 (step S102).

The controller 4 updates the area management table 33A based on a parity allocation request #2 received from the host 2 (step S103). In step S103, the controller 4 assigns an area identifier (rid=2) to parameters (k', min_m', and max_m') included in the parity allocation request #2, and registers rid=2, k', min_m', and max_m' in the area management table 33A. Subsequently, the controller 4 returns the area identifier (rid=2) to the host 2 (step S104).

The controller 4 updates the area management table 33A based on a parity allocation request #3 received from the host 2 (step S105). In step S105, the controller 4 assigns an area identifier (rid=3) to parameters (k", min_m", and max_m") included in the parity allocation request #3, and registers rid=3, k", min_m", and max_m" in the area management table 33A. Subsequently, the controller 4 returns the area identifier (rid=3) to the host 2 (step S106).

When the SSD 3 receives a write request (write command) for designating rid=1 and vid=1 from the host 2, the controller 4 allocates (k+m) physical blocks selected from (k+m) different dies one by one to a virtual block of rid=1 and vid=1, and writes k data portions and m parities over the (k+m) physical blocks (step S107). A process for allocating (k+m) physical blocks to a virtual block of rid=1 and vid=1 may be performed only when the write request for designating rid=1, vid=1, and page=0 is received.

Figure 17:
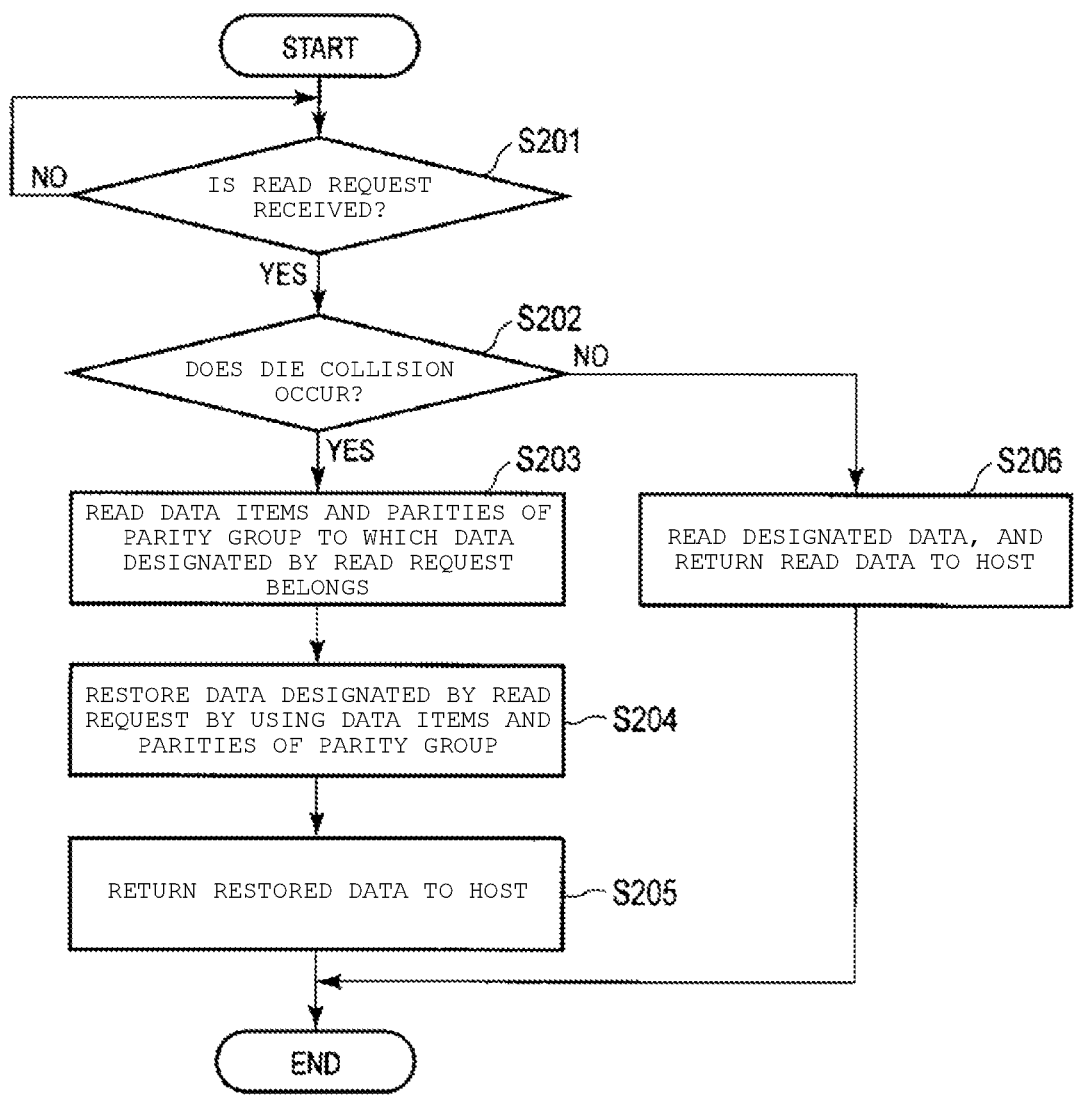
FIG. 17 is a flowchart showing a procedure of RAID read processes performed by the memory system according to the embodiment.

A flowchart in FIG. 17 shows a procedure of read processes performed by the controller 4 of the SSD 3.

When the SSD 3 receives a read request from the host 2 (YES of step S201), the controller 4 determines whether or not the die collision occurs in the die corresponding to the storage position designated by the read request (step S202). For example, in step S202, the controller 4 may determine whether or not the die collision occurs in the die that stores the target read data by referring to a queue (or a list) indicating uncompleted processes currently allocated to each die.

When the die collision occurs (YES of step S202), the controller 4 reads data items and parities of the parity group to which the data designated by the read request belongs (step S203). Subsequently, the controller 4 uses the data items and the parities of the parity group, restores the data designated by the read request (step S204), and returns the restored data to the host 2 (step S205).

When the die collision does not occur (NO of step S202), the controller 4 reads the data designated by the read request from the die that stores the designated data, and returns the read data to the host 2 (step S206).

Active Utilization of Available Capacity

Hereinafter, a process for increasing the available capacity of the SSD 3 by reducing the number m of parities will be described.

Now, it is assumed that the current available capacity of the SSD 3 is smaller than a certain threshold. The threshold may be previously determined by the controller 4 of the SSD 3, or may be determined by the user. In this situation, the controller 4 of the SSD 3 removes the parities by releasing the physical blocks PEB including the parities as necessary, and thus, the controller may decrease the number of parities to a value which is equal to min_m. For example, in the above-described example, any two of three parity physical blocks (d15, b13), (d11, b1), and (d3, b7) may be released as shown in FIG. 18.

In this example, it is assumed that (d11, b1) and (d3, b7) are released. In this case, p2 and p3 are removed. Accordingly, the available capacity of the SSD 3 increases, and thus, the user can efficiently use the capacity of the SSD 3.

When (d11, b1) and (d3, b7) are released, the controller 4 updates the virtual block management table 33C as shown in FIG. 19.

Figure 20:
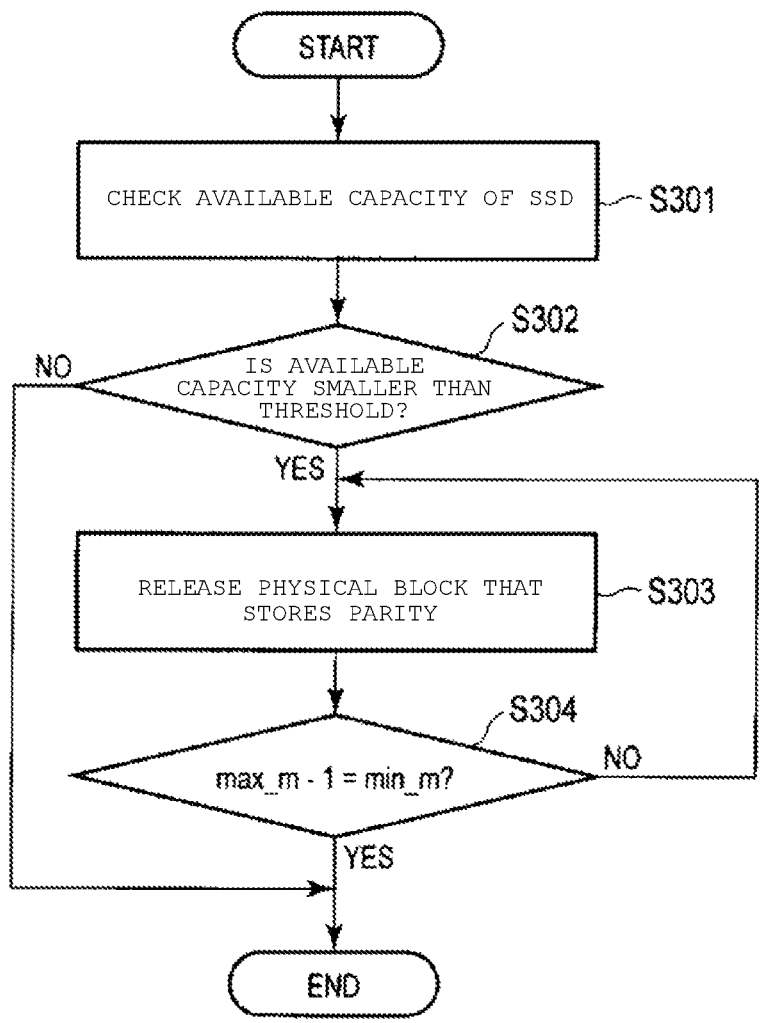
FIG. 20 is a flowchart showing a procedure of parity removing processes performed by the memory system according to the embodiment.

A flowchart in FIG. 20 shows a procedure of parity removing processes performed by the controller 4 of the SSD 3.

The controller 4 checks the available capacity of the SSD 3 (that is, the available capacity of the NAND flash memory 5) (step S301). When the available capacity of the SSD 3 is smaller than a threshold (YES of step S302), the controller 4 releases the physical blocks that store the parities (step S303). For example, when there are three physical blocks in which parities p1, p2, and p3 are respectively stored in a RAID readable area of max_m=3, one (for example, p2) of the parities p1, p2, and p3 may be initially removed by releasing one of three physical blocks.

Subsequently, the controller 4 calculates "max_m−1", and checks whether or not "max_m−1" is equal to min_m (step S304).

If "max_m−1" is not equal to min_m (NO of step S304), the controller 4 removes one (for example, p3) of the remaining parities p1 and p3 (step S303). The controller 4 calculates "max_m−1", and checks whether or not "max_m−1" is equal to min_m (step S304).

If "max_m−1" is equal to min_m (YES of step S304), the controller 4 ends the process.

Dynamic Operation using DRAM within SSD

Figure 21:
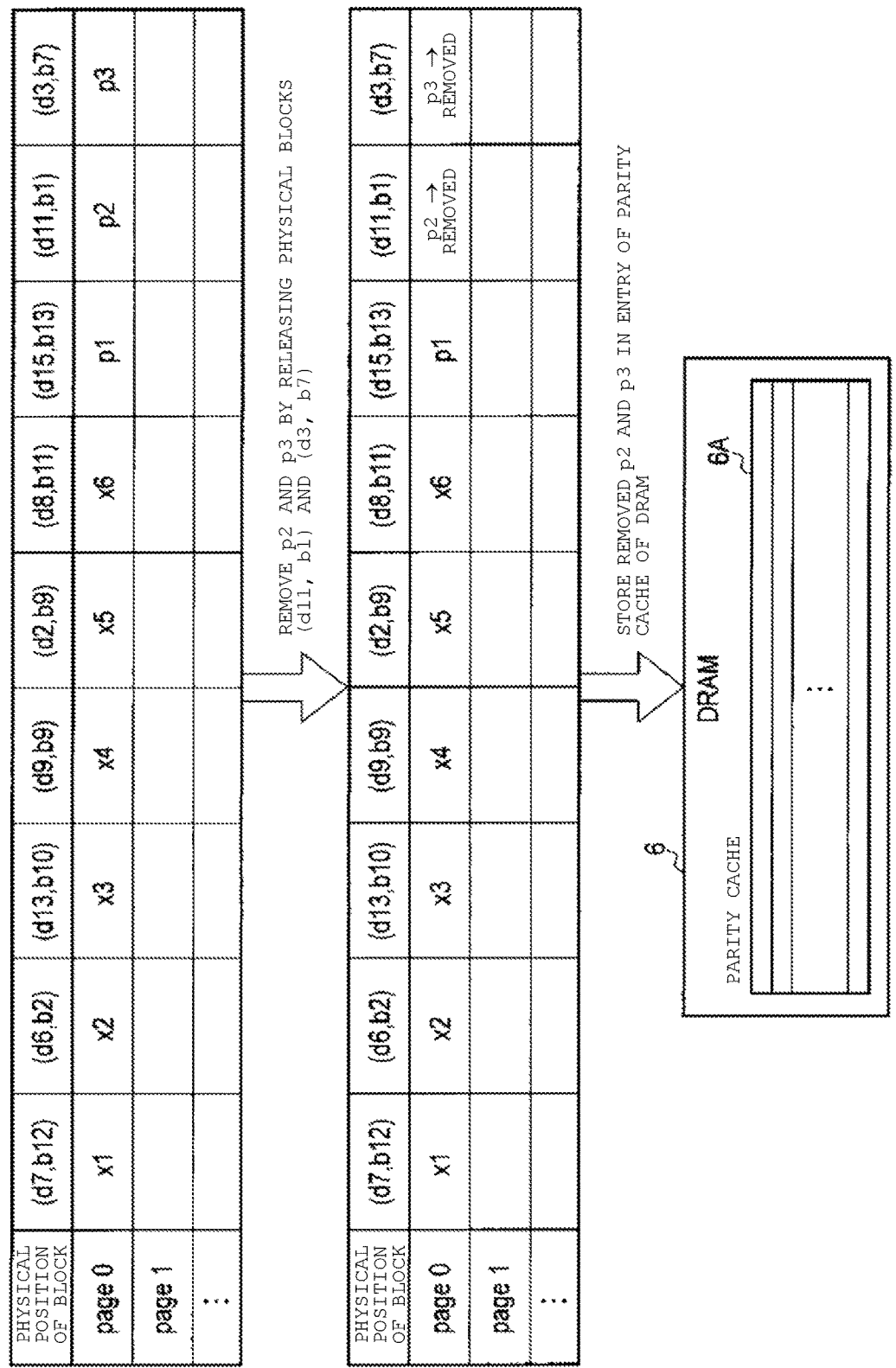
FIG. 21 is a diagram for describing a process for caching a parity in a parity cache in a DRAM within the memory system according to the embodiment.

Hereinafter, a case where the DRAM 6 within the SSD 3 is used as the parity cache for storing the parity will be described with reference to FIG. 21.

For example, it is assumed that there is a write request for any of the physical blocks of the die d6 in a time after the two parities p2 and p3 are removed. It is assumed that a read request for data (d6, b12, page=0), that is, a read request for data x2 is received from the host 2 for a period during which the die d6 is performing the process of the write request.

In this case, the controller 4 of the SSD 3 reads (x1, x3, x4, x5, x6, p1) from the dies d7, d13, d9, d2, d8, and d15, restores x2 from these x, x3, x4, x5, x6, and p1, and returns the restored x2 to the host 2.

Figures 22, 23:
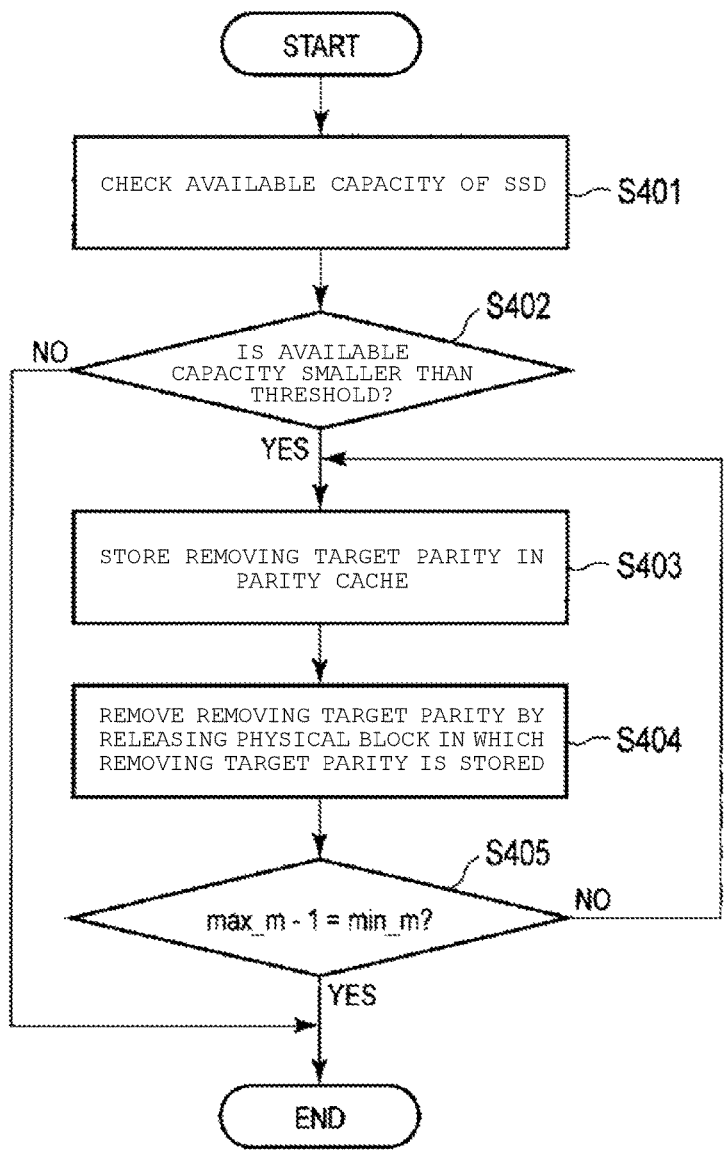
FIG. 22 is a diagram showing a configuration example of an entry of the parity cache of FIG. 21.
FIG. 23 is a flowchart showing a procedure of parity removing and cache filling processes performed by the memory system according to the embodiment.

In this case, the controller 4 of the SSD 3 may restore (by re-calculation) p2 and p3 lost by releasing (d11, b1) and (d3, b7) (case X). p2 and p3 may be re-calculated by using x1, x2, x3, x4, x5, and x6. The controller 4 may store the re-calculated parities p2 and p3 as caches in the DRAM 6. In this case, the parities p2 and p3 are stored in one of entries of a parity cache 6A on the DRAM 6. As shown in FIG. 22, in the parity cache 6A, the parities p2 and p3 together with an identifier (in this example, rid=1, vid=12, page number=0) of the parity group to which the parities p2 and p3 belong are stored in the entries of the parity cache 6A.

It is assumed that a new write request for any of the physical blocks of the die d13 is received from the host 2 in a stage that the write process in the die d6 is not ended.

It is assumed that a new read request for (d13, b10, page=0), that is, a new read request for the data x3 is received from the host 2 for a period during which the write processes corresponding to the two write requests are performed. In this case, the die collisions occur two times in the parity group including the data x3. However, only one parity p1 is stored in the NAND flash memory 5 for the parity group.

Accordingly, the controller 4 of the SSD 3 searches the parity cache 6A, and acquires the parities p2 and p3 of the parity group from the parity cache 6A. The data x3 may be restored by using any of six of (x1, x4, x5, x6, p1, p2, p3). Accordingly, for example, the controller 4 may read (x1, x4, x5, x6) from the dies d7, d9, d2, and d8, may restore x3 by using (x1, x4, x5, x6, p2, p3), and may return x3 to the host 2.

Since the area of the DRAM 6 is finite, the amount of parities stored in the DRAM 6 may be constant.

It is assumed that the amount of parities stored in the DRAM 6 reaches a predetermined amount, that is, there is no available entry in the parity cache 6A. When a parity that is not stored in the NAND flash memory 5 is newly acquired through calculation, the controller 4 may discard the newly acquired parity without storing the newly acquired parity in the parity cache 6A, or may generate a new available entry by removing an already stored parity from the parity cache 6A and may store the newly acquired parity in the new available entry. For example, a method typified by LRU may be used in the selection of the parity to be removed.

A flowchart in FIG. 23 shows a procedure of parity removing and cache filling processes performed by the controller 4 of the SSD 3.

The controller 4 checks the available capacity of the SSD 3 (that is, the available capacity of the NAND flash memory 5) (step S401). When the available capacity of the SSD 3 is smaller than a threshold (YES of step S402), the controller 4 stores a removing target parity in the parity cache 6A (step S403). For example, since there are three physical blocks in which the parities p1, p2, and p3 are respectively stored in the area of max_m=3, one (for example, p2) of the parities p1, p2, and p3 may be initially selected as the removing target parity.

Subsequently, the controller 4 releases the physical block that stores the removing target parity (step S404). In step S404, the parity (for example, p2) is removed by releasing the physical block in which the removing target parity is stored.

Subsequently, the controller 4 calculates "max_m−1", and checks whether or not "max_m−1" is equal to min_m (step S405).

If "max_m−1" is not equal to min_m (NO of step S405), the controller 4 selects, as the removing target parity, one of (for example, p3) of the remaining parities p1 and p3, and stores the removing target parity in the parity cache 6A (step S403). Subsequently, the controller 4 releases the physical block that stores the removing target parity (step S404). In step S404, the parity (for example, p3) is removed by releasing the physical block that stores the removing target parity.

The controller 4 calculates "max_m−1", and checks whether or not "max_m−1" is equal to min_m (step S405).

If "max_m−1" is equal to min_m (YES of step S405), the controller 4 ends the process.

For example, two physical blocks of three physical blocks in which the parities p1, p2, and p3 are respectively stored may be simultaneously released in the area of max_m=3 and min_m=1. In this case, the controller 4 may select as the removing target parities, for example, two parities p2 and p3. The parities p2 and p3 share the same parity group identifier. Accordingly, in step S403, the parities p2 and p3 and the parity group identifier common to the parities p2 and p3 may be stored in one entry of the parity cache 6A.

Figure 24:
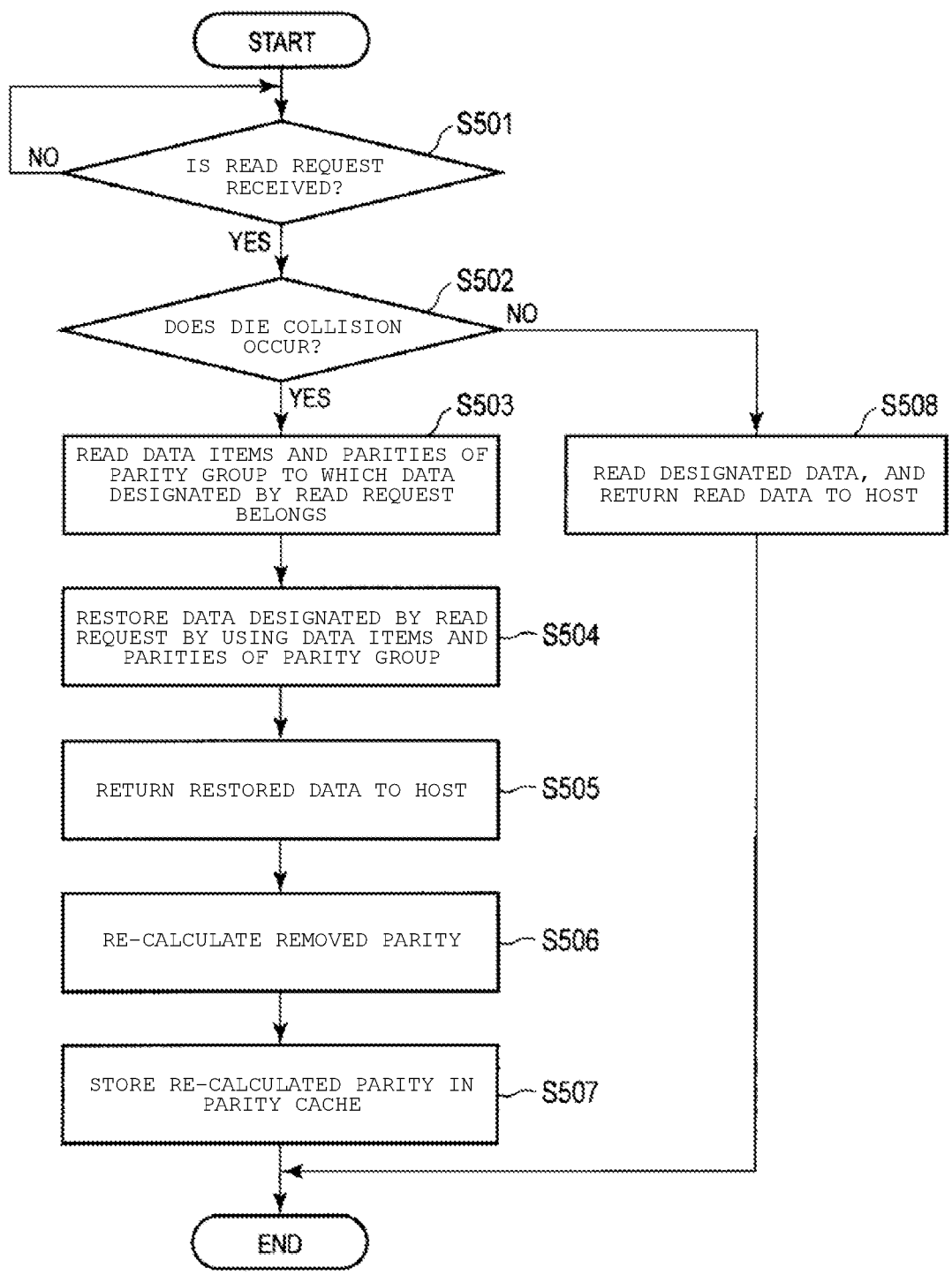
FIG. 24 is a flowchart showing another procedure of the parity removing and cache filling processes performed by the memory system according to the embodiment.

A flowchart in FIG. 24 shows another procedure of the parity removing and cache filling processes performed by the controller 4 of the SSD 3.

When the SSD 3 receives a read request from the host 2 (YES of step S501), the controller 4 determines whether or not the die collision occurs in the die corresponding to the storage position designated by the read request (step S502).

When the die collision occurs (YES of step S502), the controller 4 reads data items and parities of a parity group to which the data designated by the read request belongs (step S503). Subsequently, the controller 4 restores the data designated by the read request by using the data items and the parities of the parity group (step S504), and returns the restored data to the host 2 (step S505).

Subsequently, the controller 4 re-calculates the removed parity by using the data items and the parities of the parity group (step S506), and stores the re-calculated parity together with the parity group identifier in the parity cache 6A (step S507).

When the die collision does not occur (NO of step S502), the controller 4 reads the data designated by the read request from the die that stores the designated data, and returns the read data to the host 2 (step S508).

Hint for Read Area from Host

Hereinafter, processes performed when a notification for predicting the reading target area (referred to as a hint) is received from the host 2 will be described.

When an area to be read is able to be previously recognized, the host 2 may notify the SSD 3 of this area. The SSD 3 may preferentially protect the parity for the notified area. A case that the SSD protects the parity means a process for lowering a removal priority when any parity is removed from the SSD 3. Alternatively, the case that the SSD protects the parity means a process for lowering an erasure priority of the parity of the area when the parity of the area is included in the parity cache 6A. For example, the case that the SSD protects the parity includes a process for preferentially excluding the parity of the area from the removing target by changing the removal priority of the parity of the notified area when a removal order of the parities within the parity cache 6A is determined by using an algorithm such as LRU.

Figure 25:
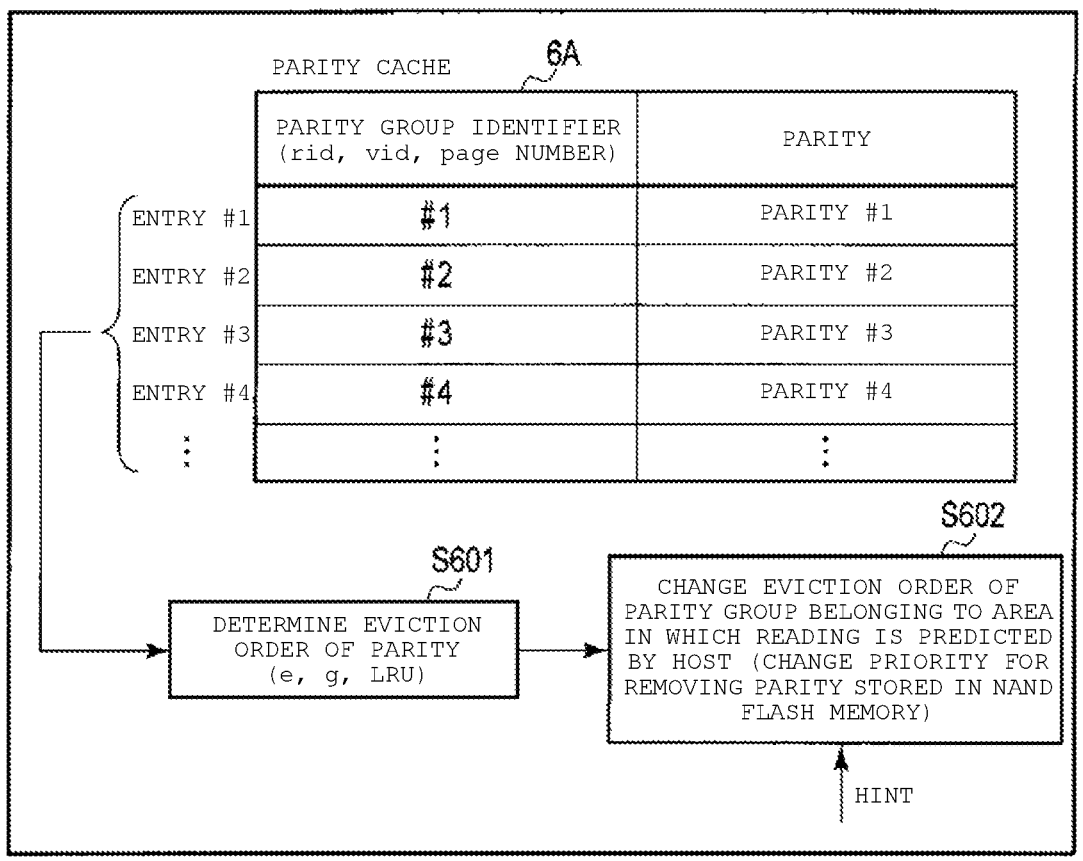
FIG. 25 is a diagram for describing a parity removing order changing process performed by the memory system according to the embodiment.

FIG. 25 shows a process for changing the order of removing the parity from the NAND flash memory 5 or the parity cache 6A (also referred to as removal priority).

The controller 4 determines a removal order of the parities according to an algorithm typified by LRU for each parity within the parity cache 6A (step S601).

In this example, when the SSD 3 receives the notification (hint) for predicting the reading target area from the host 2, the controller 4 preferentially leaves the parity in the parity cache 6A by changing the removal order of the parity of the reading target area notified from the host 2 (step S602). For example, if the reading target area is the virtual block of rid=1 and vid=1, the removal order of the parity associated with the virtual block of rid=1 and vid=1 is changed, and the parity is preferentially left in the parity cache 6A.

The same process is performed even when the parity to be removed from the NAND flash memory 5 is determined. For example, if the reading target area is the virtual block of rid=1 and vid=1, the removal order of the parity associated with the virtual block of rid=1 and vid=1 is changed, and the parity is preferentially left in the NAND flash memory 5.

Alternatively, the parity of the reading target area designated by the hint may be actively restored in an idle period of the SSD 3. For example, when the parity of the reading target area designated by the hint is already removed, the parity of the reading target area is restored. The controller 4 may store the restored parity in the parity cache 6A of the DRAM 6, or may write the restored parity in the physical block.

The host 2 may also notify the SSD 3 of an area in which reading will not be performed when the area is able to be recognized. The SSD 3 may preferentially remove the parity for the area.

Utilization of Memory of Host

Hereinafter, an example in which a memory of the host 2 is utilized will be described.

The host 2 includes a random-access memory (for example, DRAM), and a size of the DRAM of the host 2 is typically greater than a size of the DRAM 6 of the SSD 3. Accordingly, the DRAM of the host 2 is used, and thus, it is possible to manage a larger number of parities.

Figure 26:
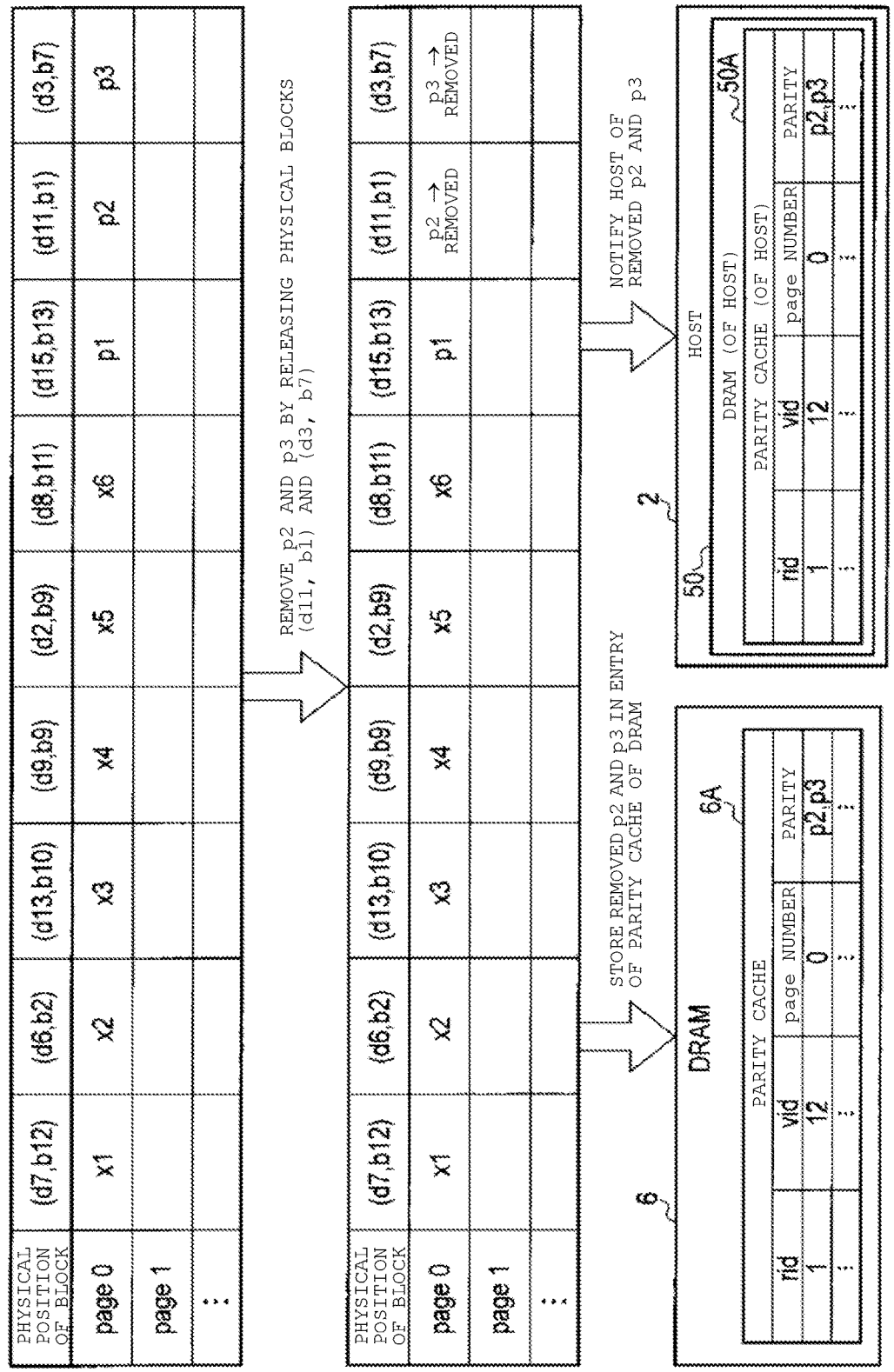
FIG. 26 is a diagram for describing a process for notifying a host of the removed parity from the memory system according to the embodiment.

The SSD 3 of the controller 4 may notify the host 2 of the parity and the position thereof (by specifying the parity group identifier corresponding to the parity) in a time when the parity is calculated, for example, a time when the erased parity is calculated when writing is initially performed or when a RAID reading is performed. This case is shown in FIG. 26. In FIG. 26, a case where the parities p2 and p3 removed from the NAND flash memory 5 are stored in the parity cache 6A of the SSD 3 together with the parity group identifier (rid 1, vid 12, page=0) and the parities p2 and p3 and the parity group identifier (rid 1, vid 12, page=0) are notified to the host 2 is illustrated. The host 2 stores the notified parities p2 and p3 and parity group identifier (rid 1, vid 12, page=0) in a parity cache 50A on a DRAM 50 of the host 2.

The host 2 may add the parity to a read request when the host 2 recognizes a parity for a position of data to be read from now.

For example, in a state of the case X, the controller 4 of the SSD 3 re-calculates the parities p2 and p3 lost by releasing (d11, b1) and (d3, b7), and notifies the host 2 of the re-calculated parities p2 and p3 by transmitting the following parity notifications to the host 2.

Parity notification (rid=1, vid=12, page=0, [p2, p3])

When this notification is received, the host 2 stores the parity group identifier (rid 1, vid 12, page=0) and the parities p2 and p3 in an entry of the parity cache 50A on the DRAM 50 of the host 2.

When there is an attempt to transmit the read request, the host 2 searches for an entry matching the SSD address (rid, vid, page number) to be designated by the read request from the parity cache 50A. When there is an entry matching the SSD address (rid, vid, page number) to be designated by the read request in the parity cache 50A, the host 2 may transmit the read request including the parity in the entry to the SSD 3. The host 2 may transmit all the parities to be recognized to the SSD 3, or may selectively transmit several parities to the SSD 3.

It is assumed that an entry of (rid=1, vid=12, page=0) is erased from the parity cache 6A of the SSD 3, and it is assumed that only the parity (value is p1) stored in the physical block (d15, b13) is left in the NAND flash memory 5.

In this example, it is assumed that the host 2 attempts to read the data x3. In this case, since the parities p2 and p3 of the parity group to which the data x3 belongs are left in the parity cache 50A of the host 2, the host 2 transmits the read request with the parities p2 and p3.

Read request (rid=1, vid=12, page=2, parities=(p2, p3))

This read request is to read (d13, b10, page=0) from an internal perspective of the SSD 3.

At this time, it is assumed that the write process is being performed on d7 and d13.

Only one parity p1 of the parity group to which the reading target data belongs is present in the SSD 3. Accordingly, the reading target data x3 is not able to be typically restored in a situation in which collision occurs in another die d7 in addition to the die d13 which is the reading target.

However, since the parities p2 and p3 are added from the host 2, the controller 4 of the SSD 3 can restore x3 by using any of six data items of [x2, x4, x5, x6, p1, p2, p3], and can return x3 to the host 2.

When the number of parities present in the SSD 3 is insufficient due to the erasure of the parity and the parity is not added from the host 2, the controller 4 of the SSD 3 may return an error to the host 2. In this case, the controller 4 may transmit the error and all the data items (including the parities) to be read with no collision within the parity group to which the reading target data belongs to the host 2.

It is assumed that an entry of (rid=1, vid=12, page=0) is erased from the parity cache 6A of the SSD 3, and it is assumed that only the parity (value is p1) stored in the physical block (d15, b13) is left in the NAND flash memory 5.

In this example, it is assumed that the host 2 attempts to read the data x3. In this case, it is assumed that the host 2 transmits the following read requests which do not include the parity.

Read request (rid=1, vid=12, page=2)

This read request is to read (d13, b10, page=0) in an internal perspective of the SSD 3.

At this time, it is assumed that the write process is being performed on d7 and d13.

One parity p1 of the parity group to which the reading target data belongs is present in the SSD 3. Thus, x3 is not able to be restored in a situation in which a collision occurs in another die d7 in addition to the reading target die d13.

In this case, the controller 4 of the SSD 3 reads all the data items (including the parities) to be read with no collision within the parity group including the reading target data from the NAND flash memory 5, and returns all the read data items (including the parities) together with an error to the host 2.

Page read error (rid=1, vid=12, page=2, [x2, x4, x5, x6, p1])

When the error is received, the host 2 searches the parity cache 50A of the host 2. When the parity of the parity group including the reading target data is present in the parity cache 50A, the reading target data x3 may be restored by using the parity.

In this example, since p2 and p3 are stored, x3 may be restored by using any of six data items of [x2, x4, x5, x6, p1, p2, p3].

The host 2 may explicitly instruct the SSD 3 to recognize a process to be performed by the SSD 3 when data is not able to be restored in the RAID reading.

For example, when data is not able to be restored in the RAID reading, the host 2 may instruct the SSD 3 to read all the data items (including the parities) to be read with no die collision, and to return the read data items together with a page read error to the host 2.

Alternatively, when data is not able to be restored in the RAID reading, the host 2 may instruct the SSD 3 to simply return only the error to the host 2 without reading the data items to be read with no die collision.

Alternatively, when data is not able to be restored in the RAID reading, the host 2 may instruct the SSD 3 to wait until the data is read, read the data, and return the data to the host 2.

Figure 27:
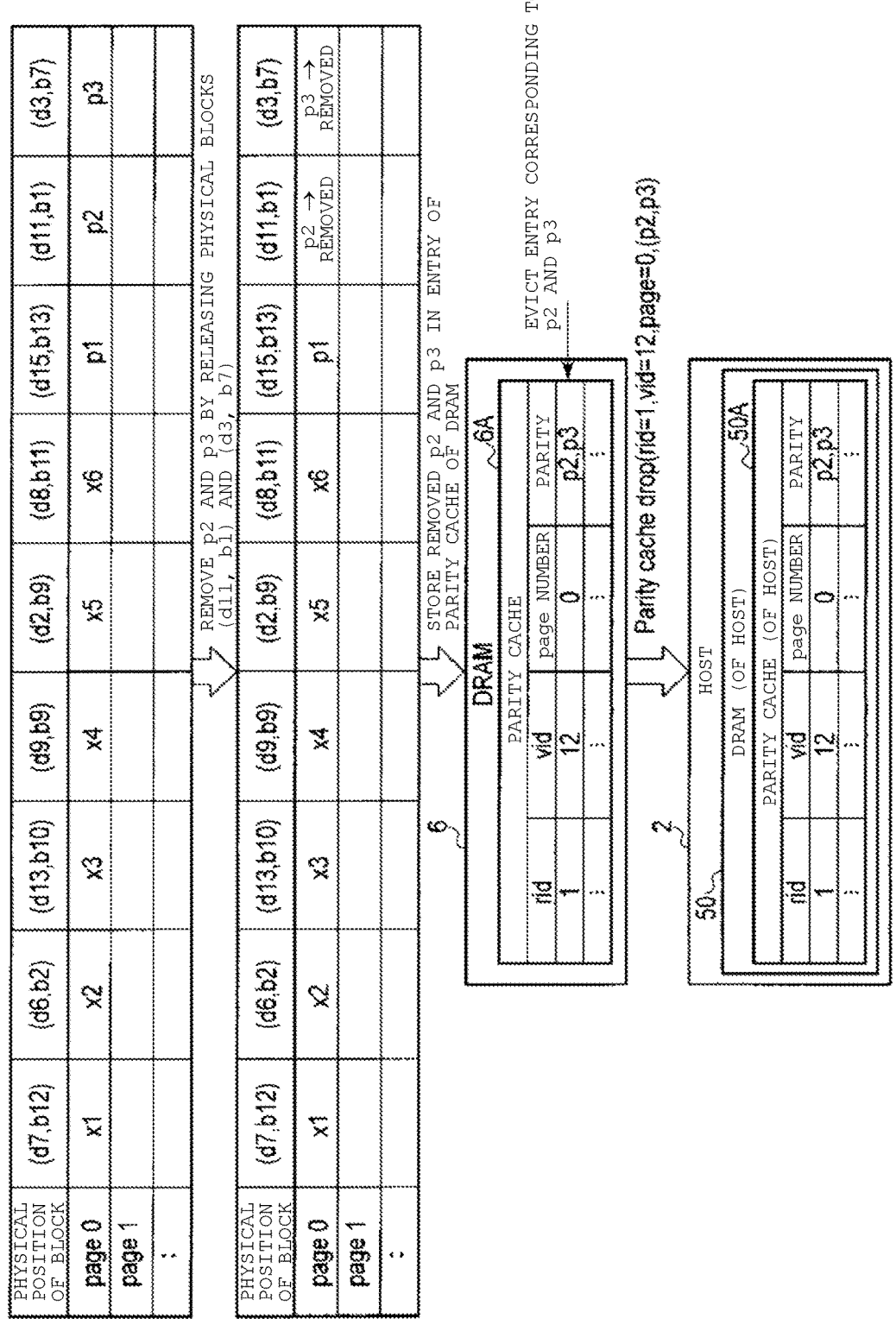
FIG. 27 is a diagram for describing a process for notifying the host of the removed parity from the memory system according to the embodiment.

The controller 4 of the SSD 3 may notify the host 2 of the process when the entry of the parity cache 6A is removed. This case is illustrated in FIG. 27. The example in FIG. 27 illustrates a case where (rid 1, vid 12, page=0) is removed from the parity cache 6A of the SSD 3. In this case, the controller 4 transmits the following notification (parity cache drop) to the host 2.

Parity cache drop (rid=1, vid=12, page=0, [p2, p3])

When this notification is received, if the same entry as the entry notified by the parity cache drop is present in the parity cache 50A of the host 2, the host 2 may preferentially protect this entry. That is, the host may perform a process for preferentially excluding this entry from removing targets.

Figure 28:
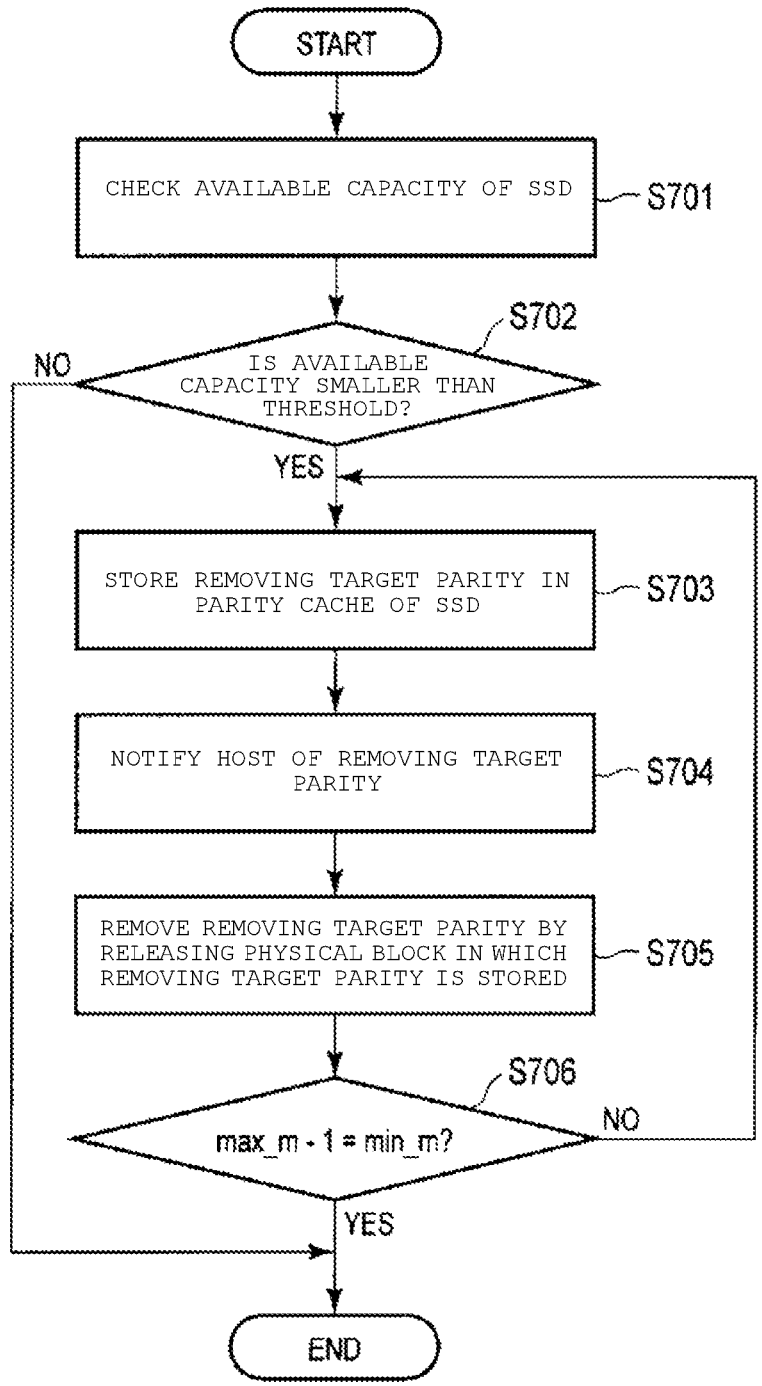
FIG. 28 is a flowchart showing a procedure of parity removing and parity notifying processes performed by the memory system according to the embodiment.

A flowchart in FIG. 28 shows a procedure of parity removing and parity notifying processes performed by the controller 4 of the SSD 3.

The controller 4 checks the available capacity of the SSD 3 (that is, the available capacity of the NAND flash memory 5) (step S701). When the available capacity of the SSD 3 is smaller than a threshold (YES of step S702), the controller 4 stores the removing target parity in the parity cache 6A (step S703). For example, when there are three physical blocks in which the parities p1, p2, and p3 are respectively stored in the area of max_m=3, one (for example, p2) of the parities p1, p2, and p3 may be initially selected as the parity which is the removing target.

Subsequently, the controller 4 notifies the host 2 of the removing target parity (step S704), and releases the physical block in which the removing target parity is stored (step S705). In step S705, the parity (for example, p2) is removed by releasing the physical block in which the removing target parity is stored.

Subsequently, the controller 4 calculates "max_m−1", and checks whether or not "max_m−1" is equal to min_m (step S706).

If "max_m−1" is not equal to min_m (NO of step S706), the controller 4 selects, as the removing target parity, one (for example, p3) of the remaining parities p1 and p3, stores the removing target parity in the parity cache 6A (step S703), and notifies the host 2 of the removing target parity (step S704). Subsequently, the controller 4 releases the physical block in which the removing target parity is stored (step S705). In step S705, the parity (for example, p3) is removed by releasing the physical block in which the removing target parity is stored.

The controller 4 calculates "max_m−1", and checks whether or not "max_m−1" is equal to min_m (step S706).

If "max_m−1" is equal to min_m (YES of step S706), the controller 4 ends the process.

For example, two physical blocks of three physical blocks in which the parities p1, p2, and p3 are respectively stored may be simultaneously released in the area of max_m=3 and min_m=1. In this case, the controller 4 may select as the removing target parities, for example, two parities p2 and p3. The parities p2 and p3 share the same parity group identifier. Accordingly, in step s704, the parities p2 and p3 and the parity group identifier common to the parities p2 and p3 may be notified to the host 2.

Figure 29:
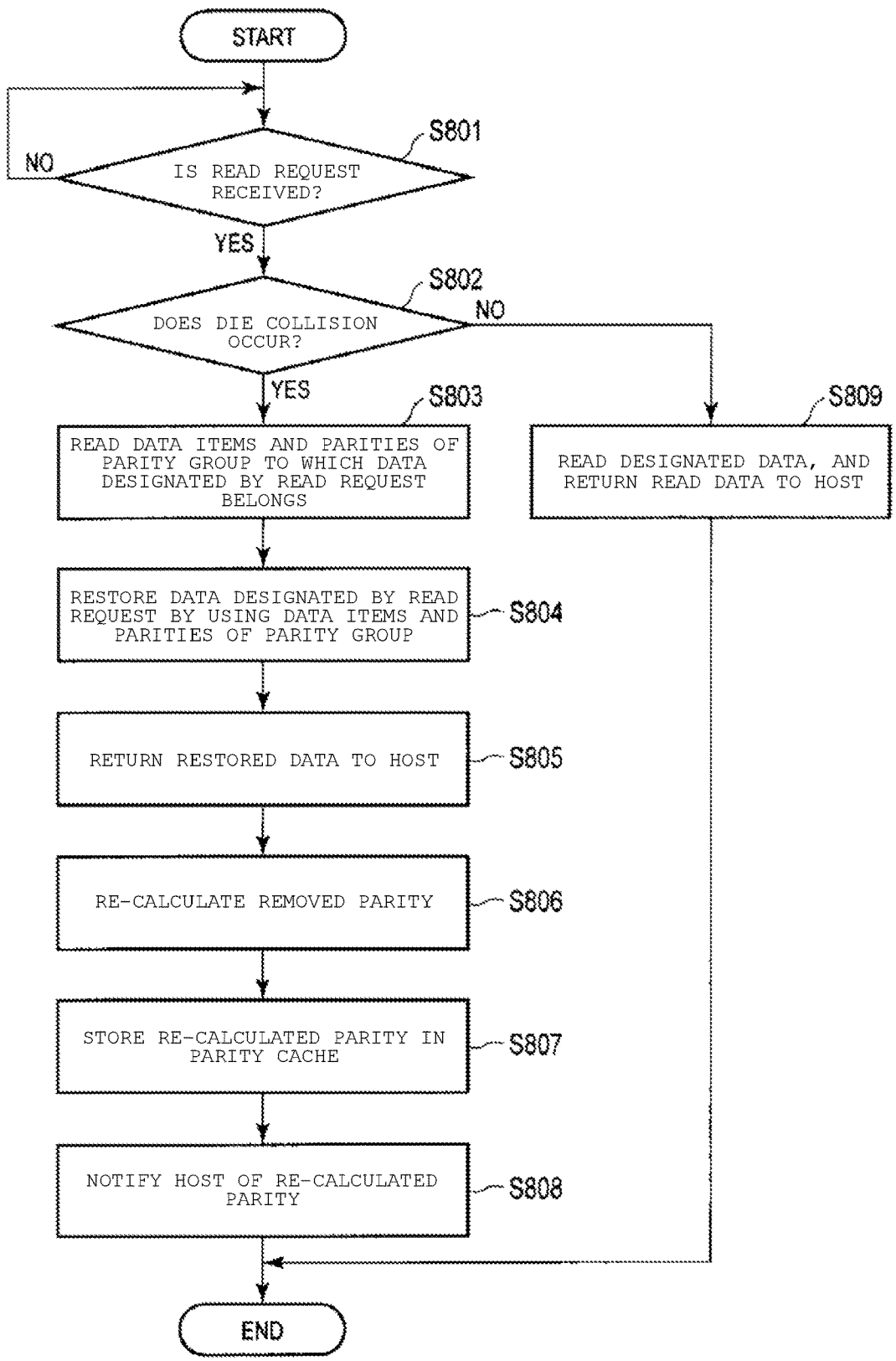
FIG. 29 is a flowchart showing another procedure of the parity removing and parity notifying processes performed by the memory system according to the embodiment.

A flowchart in FIG. 29 shows another procedure of the parity removing and parity notifying processes performed by the controller 4 of the SSD 3.

When the SSD 3 receives a read request from the host 2 (YES of step S801), the controller 4 determines whether or not the die collision occurs in the die corresponding to the storage position designated by the read request (that is, the die that stores the target read data) (step s802).

When the die collision occurs (YES of step S802), the controller 4 reads data items and parities of a parity group to which the data designated by the read request belongs (step S803). When a certain parity of the parity group is removed, the data items and the parities of the parity group except for the reading target data designated by the read request and the removed parity are read from the NAND flash memory 5 in step S803. Subsequently, the controller 4 restores the data designated by the read request by using the read data items and parities of the parity group (step S804), and returns the restored data to the host 2 (step S805).

Subsequently, the controller 4 re-calculates the removed parity by using the restored data and the read data items of the parity group (step S806), and stores the re-calculated parity together with the parity group identifier in the parity cache 6A (step S807). The controller 4 notifies the host 2 of the re-calculated parity together with the parity group identifier (step S808).

When the die collision does not occur (NO of step S802), the controller 4 reads the data designated by the read request from the die that stores the designated data, and returns the read data to the host 2 (step S809).

Figure 30:
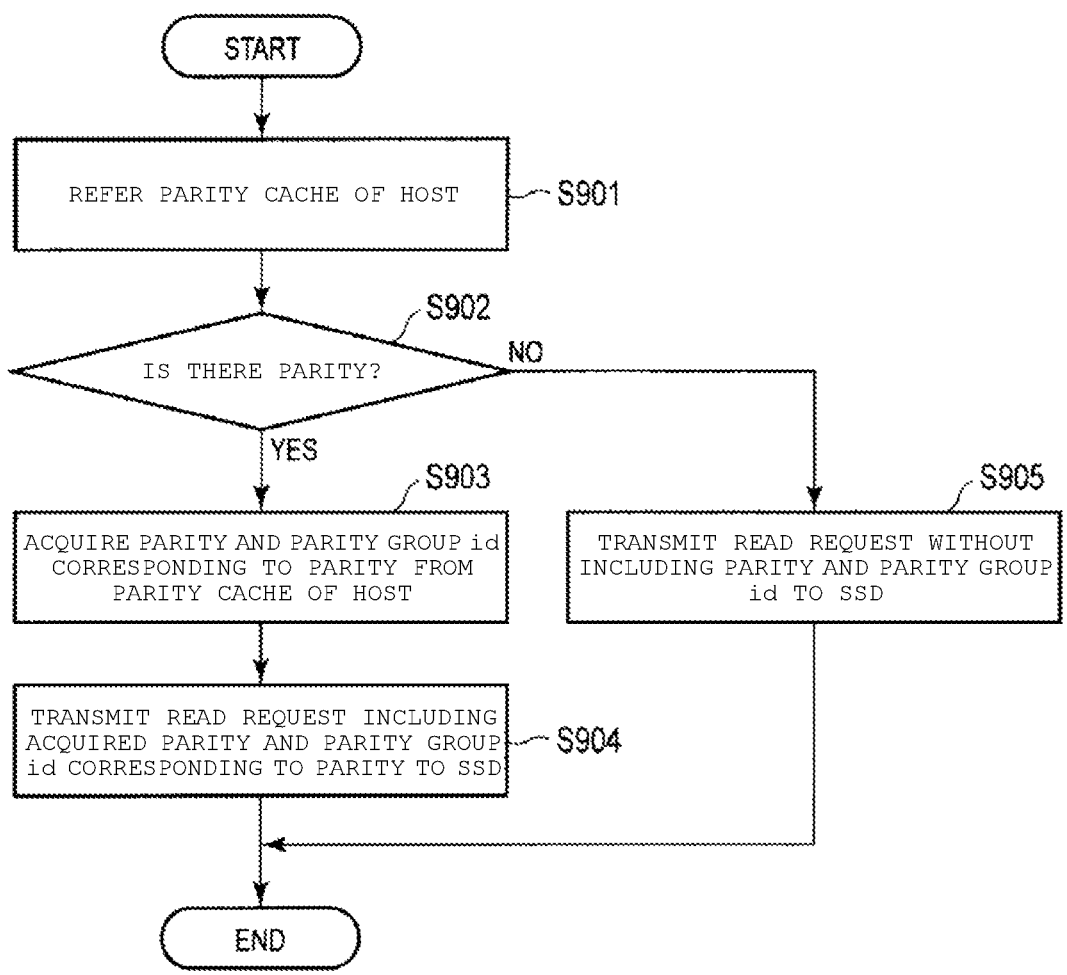
FIG. 30 is a flowchart showing a procedure of a read request transmission process performed by the host.

A flowchart in FIG. 30 shows a procedure of a read request transmission process performed by the host 2.

When the host 2 attempts to transmit a read request, the host 2 refers to the parity cache 50A of the host 2 (step S901), and determines whether or not the parity of the parity group corresponding to the reading target data to be designated by the read request is present in the parity cache 50A of the host 2 (step S902). For example, if the SSD address to be designated by the read request is (rid=1, vid=12, page=0), an entry having the same parity group identifier (parity group id) as (rid=1, vid=12, page=0) is searched from the parity cache 50A of the host 2.

If the parity of the parity group corresponding to the reading target data to be designated by the read request is present in the parity cache 50A of the host 2 (YES of step S902), the host 2 acquires the parity and the parity group id corresponding to the parity from the parity cache 50A of the host 2 (step S903). The host 2 transmits the read request including the acquired parity and parity group id corresponding to the parity to the SSD 3 (step S904).

Meanwhile, if the corresponding parity is not present in the parity cache 50A of the host 2 (NO of step S902), the host 2 transmits a typical read request which does not include the parity and the parity group id to the SSD 3 (step S905).

Figure 31:
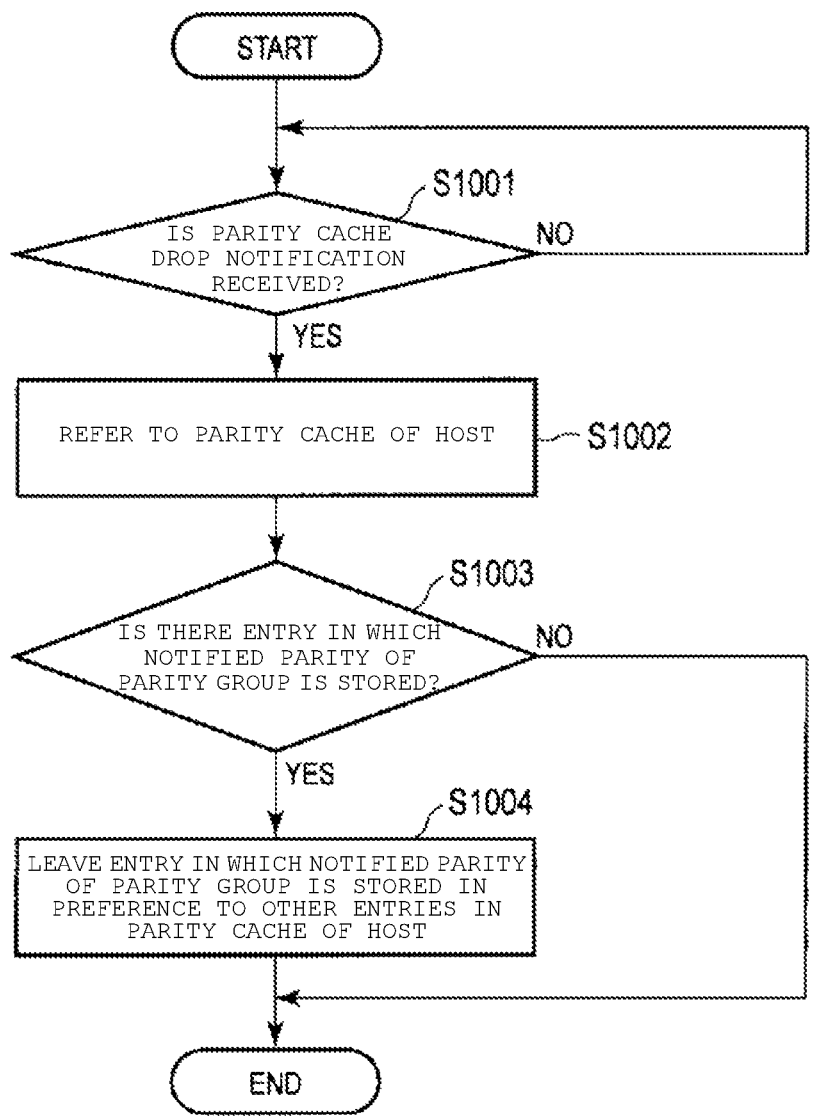
FIG. 31 is a flowchart showing a procedure of a parity protecting process performed by the host.

FIG. 31 shows a procedure of a parity protecting process performed by the host when the host 2 receives the parity cache drop notification.

When the host 2 receives the parity cache drop notification from the SSD 3 (YES of step S1001), the host 2 determines whether or not an entry in which the parity of the parity group notified by the parity cache drop notification is stored is present in the parity cache 50A by referring to the parity cache 50A of the host 2 (step S1002).

When the entry in which the notified parity of the parity group is stored is present in the parity cache 50A (YES of step S1003), the host 2 performs a process for leaving the entry in which the notified parity of the parity group is stored in the parity cache 50A of the host in preference to other entries (step S1004). That is, the host 2 typically determines that a removal order of the parities of the parity cache 50A of the host by using an algorithm typified by LRU, but leaves the parity in preference to other parities in the parity cache 50A of the host by changing the removal order of the notified parity when the parity cache drop notification is received. Accordingly, it is possible to increase a probability that the parity lost in the SSD 3 will be present in the parity cache 50A of the host.

Throttling of Writing

The controller 4 of the SSD 3 may limit a speed at which the host 2 writes data such that die collision possibilities of all the RAID readable areas satisfy limitations corresponding to these areas or such that a die collision possibility of at least one RAID readable area selected from all the areas satisfies a limitation corresponding to this area. In this example, the limitation corresponding to each area is equivalent to the number of times of the avoidable die collisions in the RAID reading of each area, that is, the value of m of each area.

For example, the controller 4 acquires the combination of dies allocated to each area (each RAID readable area). The combination of dies allocated to a certain area is referred to as a die group. In the example of the virtual block management table 33C of FIG. 11, a die group of a RAID readable area of rid=1 is (d7, d6, d13, d9, d2, d8, d15, d11, d3).

For example, the controller 4 may manage write requests received from the host 2 by a list or a queue, and may select a write request to be performed next among these write requests by using an evaluation function. In this case, the controller 4 may schedule execution timings of the write requests received from the host 2 such that the die collision possibilities of all the RAID readable areas satisfy the limitations corresponding to these areas. Alternatively, the controller 4 may give priorities to the RAID readable areas, and may schedule the execution timings of the write requests such that the number of times of the write operations simultaneously performed on the die group of RAID readable area having the highest priority is limited to be equal to or less than the number m of parities of the RAID readable area having the highest priority.

Hereinafter, it is assumed that the SSD 3 includes 16 dies d0 to d15, die groups of four areas are classified as follows, and each group has a RAID configuration of k=3 and m=1 for the sake of convenience in the description.

Die group of area#1: (d0, d1, d2, d3)
Die group of area#2: (d4, d5, d6, d7)
Die group of area#3: (d8, d9, d10, d11)
Die group of area#4: (d12, d13, d14, d15)

It is assumed that 16 write requests which respectively correspond to 16 dies d0 to d15 are received from the host 2. In this case, the controller 4 may schedule 16 write requests such that only one write operation is performed at one time in each die group. For example, a write request for d0, a write request for d4, a write request for d8, and a write request for d12 may be selected from 16 write requests, and the write operations corresponding to the write requests may be performed. When any of the write operations is completed, for example, when the write operation of d0 is completed, a write request for another die within the die group of the area #1 may be selected as the write request to be executed next.

In a case where the dies to be allocated to each die are randomly selected, several dies are used so as to be common to the plurality of RAID readable areas. In addition, the number of allocated dies is actually different for each area. Thus, there are some cases where it is difficult to schedule the write requests such that the die collision possibilities of all the areas satisfy the limitations of the areas. Accordingly, in a case where the dies to be allocated to each area are randomly selected, the write requests from the host 2 may be scheduled such that the die collision possibility of at least one area selected from all the areas satisfies the limitation corresponding to the area.

Figures 32, 33:
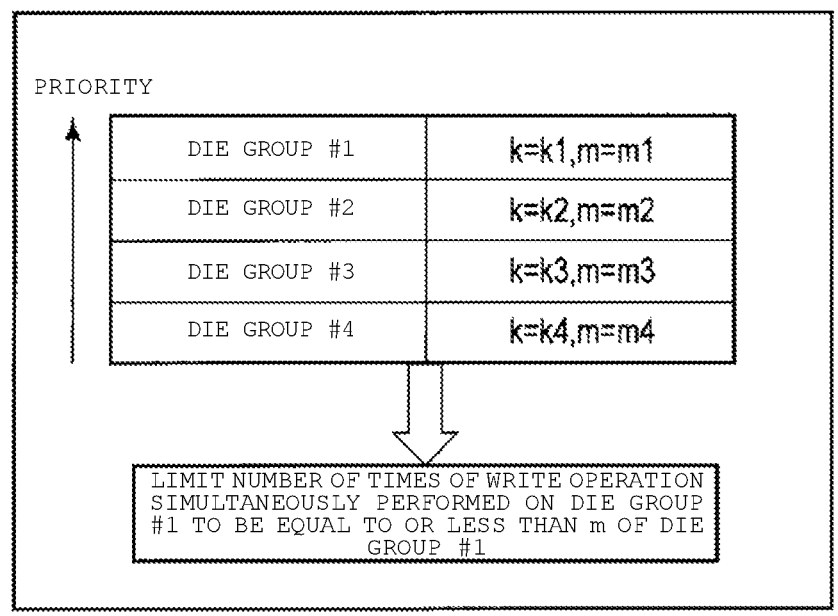
FIG. 32 is a diagram for describing a write throttling process performed by the memory system according to the embodiment.
FIG. 33 is a diagram showing an example of a two-dimensional parity capable of being applied to the memory system according to the embodiment.

In the example of FIG. 32, priorities are given to four die groups #1, #2, #3, and #4, and the die group #1 is a die group having the highest priority. (k1+m1) dies are allocated to the die group #1. In this case, the controller 4 may limit the number of times of the write operations simultaneously performed on (k1+m1) dies corresponding to the die group #1 to be equal to or less than m1 by scheduling the execution timings of the write requests received from the host 2.

Parity Calculation Method and Parity Configuration are Varied

Hereinafter, the varying of the parity calculation method and the parity configuration will be described.

The host 2 may designate a parity calculation method to be used for each area based on a workload of the host 2 in addition to dynamically designating an arbitrary (k+m) for the SSD 3. As the parity calculation method to be used, there are XOR parity, P parity/Q parity (P+Q), or Reed Solomon. For example, the XOR parity may be used for an area of m=1, (P+Q) parity may be used for an area of m=2, and Reed Solomon may be used for an area of m>2.

The host 2 may designate Local Reconstruction Codes (LRC) as a parity configuration to be used. When the LRC is used, since the data which is not able to be immediately read due to the die collision is able to be restored by a smaller number of data items and parities, it is possible to expect that a tail read latency is further improved.

The host 2 may designate a two-dimensional parity as shown in FIG. 33, as the parity configuration to be used. px1 to px4 are parities calculated from data portions arranged in a horizontal direction. That is, for example, px1 is a parity that uses (x1, x2, x3, x4) as targets, and py5 is a parity that uses (py1, py2, py3, py4) as targets. py1 to py5 are parities calculated from data portions arranged in a vertical direction. That is, for example, py1 is a parity that uses (x1, x5, x9, x13) as targets, and py5 is a parity that uses (px1, px2, px3, px4) as targets. Accordingly, it is possible to further widen a pattern of an allowable die collision. The two-dimensional parity of FIG. 33 may be used as one kind of RAID configuration of k=16 and m=9.

The controller 4 of the SSD 3 may report all the parity calculation methods that the SSD 3 can support to the host 2 in advance. The host 2 selects the parity calculation method to be used among the reported parity calculation methods. The parity calculation method may be selected for each area. When the parity calculation method is not designated from the host 2, the controller 4 of the SSD 3 may spontaneously select the parity calculation method to be used.

Similarly, the controller 4 of the SSD 3 may report all the parity configurations (e.g., the one-dimensional parity, the two-dimensional parity, and LRC) that the SSD 3 can support to the host 2 in advance. The host 2 selects the parity configuration to be used among the parity configurations. The parity configuration may be selected for each area. When the parity configuration is not designated from the host 2, the controller 4 of the SSD 3 may spontaneously select the parity configuration to be used.

Figure 34:
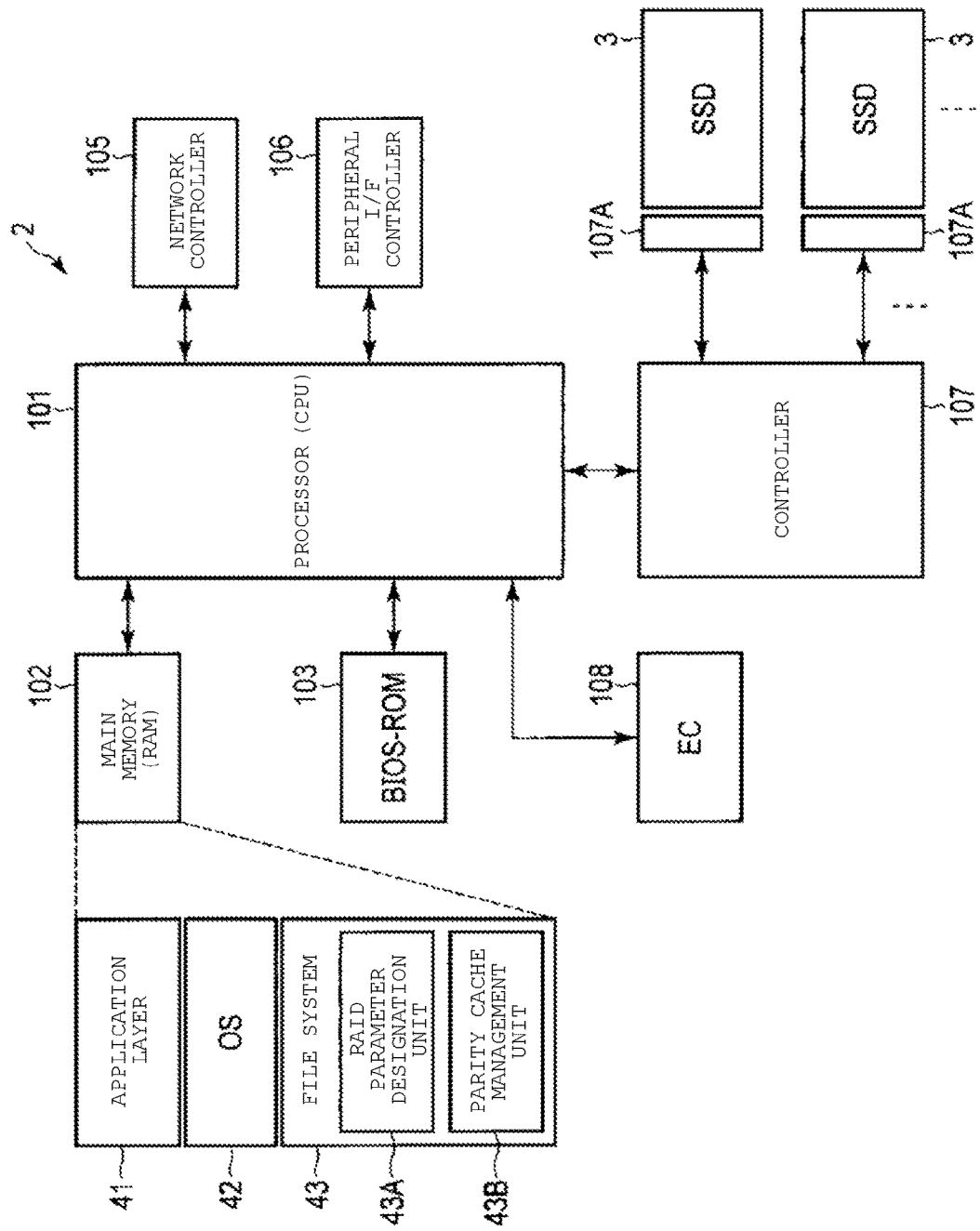
FIG. 34 is a block diagram showing a configuration example of the host.

FIG. 34 shows an example of a hardware configuration of the information processing device (e.g., a computing device) functioning as the host 2.

The information processing device is realized as a computing device such as a server (for example, a storage server). The information processing device includes a processor (CPU) 101, a main memory 102, a BIOS-ROM 103, a network controller 105, a peripheral interface controller 106, a controller 107, and an embedded controller (EC) 108.

The processor 101 is a CPU configured to control operations of components of the information processing device. The processor 101 executes various programs loaded to the main memory 102 from any one of the plurality of SSDs 3. The main memory 102 is a random-access memory such as a DRAM. A certain storage area on the random-access memory is used as the parity cache 50A of the host. The program executed by the processor 101 includes the application software layer 41, the OS 42, the file system 43, the RAID parameter designation unit 43A, and parity cache management unit 43B.

The processor 101 executes a basic input and output system (BIOS) stored in the BIOS-ROM 103 which is a non-volatile memory. BIOS is a system program for hardware control.

The network controller 105 is a communication device such as a wired LAN controller or a wireless LAN controller. The peripheral interface controller 106 is configured to perform communication with a peripheral device such as a USB device.

The controller 107 is configured to perform communication with devices connected to a plurality of connectors 107A. In the present embodiment, the plurality of SSDs 3 is connected to the plurality of connectors 107A, respectively. The controller 107 may be a SAS expander, a PCIe switch, a PCIe expander, a flash array controller, or a RAID controller.

The EC 108 functions as a system controller configured to perform power management of the information processing device. The EC 108 turns on and turns off the information processing device in response to an operation of the power switch by a user. The EC 108 is realized as a processing circuit such as a one-chip microcontroller. The EC 108 may include a keyboard controller that controls an input device such as a keyboard (KB).

Figure 35:
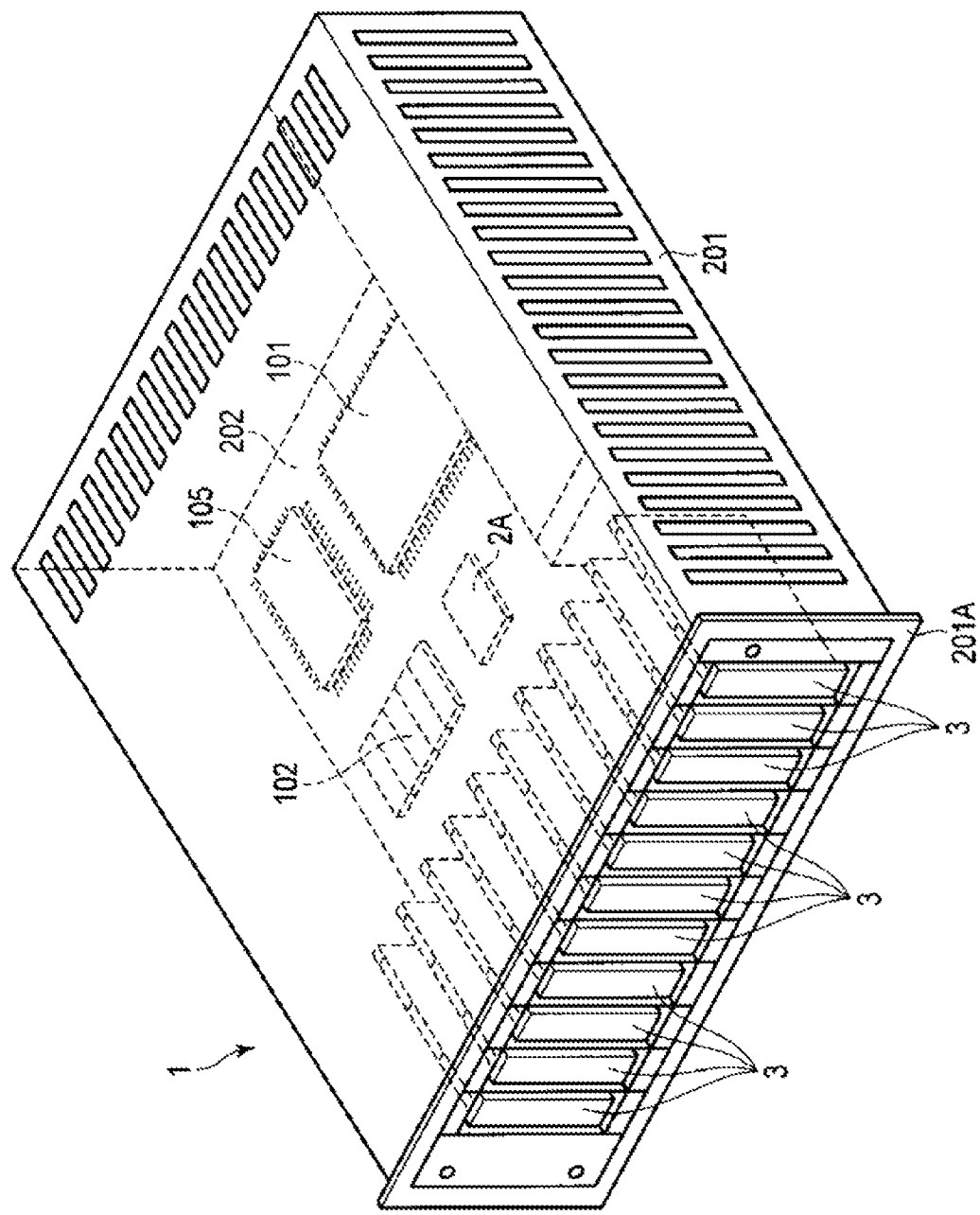
FIG. 35 is a diagram showing a configuration example of a computer including the host and the memory system according to the embodiment.

FIG. 35 shows a configuration example of the information processing device (e.g., a computing device) including the plurality of SSDs 3 and the host 2.

The information processing device includes a thin box-shaped casing 201 capable of being accommodated in a rack. The plurality of SSDs 3 may be arranged within the casing 201. In this case, each SSD 3 may be detachably inserted into a slot provided in a front surface 201A of the casing 201.

A system board (e.g., motherboard) 202 is disposed in the casing 201. Various electronic components including the CPU 101, the memory 102, the network controller 105, and the controller 107 are mounted on the system board 202. These electronic components function as the host 2.

As described above, according to the present embodiment, the host 2 can designate any combination of k and m for each area in the SSD 3, and thus, the plurality of areas having different characteristics related to the capacity efficiency and the tolerance to the die collision can coexist in the SSD 3. That is, a combination of k and m indicating the number of data items and the number of parities corresponding to a first area of the NAND flash memory 5 and a combination of k' and m' indicating the number of data items and the number of parities corresponding to a second area of the NAND flash memory 5 are managed based on a request from the host 2 for designating the number of data portions and the number of parities constituting one parity group of the RAID for each area of the NAND flash memory 5. The combination of k' and m' is different from the combination of k and m. k data portions and m parities received from the host 2 are written over (k+m) physical blocks selected from (k+m) different non-volatile memory dies one by one based on the write request from the host 2 for the first area. Accordingly, the write data from the host 2 can be stored as the parity group including k data portions and m parities in the NAND flash memory 5, and thus, it is possible to avoid the die collision up to m times. k' data portions and m' parities received from the host 2 are written over (k'+m') physical blocks selected from (k'+m') different non-volatile memory dies one by one based on a write request from the host 2 for the second area. Accordingly, the write data from the host 2 can be stored as the parity group including k' data portions and m' parities in the NAND flash memory 5, and thus, it is possible to avoid the die collision up to m' times.

Accordingly, it is possible to improve the tolerance to the die collision that the read request for the die which is performing the write operation is received by using the parity. In addition, since the combination of the number of data portions and the number of parities are different from each other among the areas, the plurality of areas having different characteristics related to the capacity efficiency and the tolerance to the die collision can coexist in the SSD 3.

In the present embodiment, the NAND memory is used as the example of the non-volatile memory. However, the function of the present embodiment may be applied to other various non-volatile memories such as a magnetoresistive random-access memory (MRAM), a phase change random access memory (PRAM), a resistive random access memory (ReRAM), and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system capable of being connected to a host, the system comprising:
   a non-volatile memory that includes a plurality of non-volatile memory dies, each of which includes a plurality of physical blocks; and
   a controller that is electrically connected to the plurality of non-volatile memory dies to control the non-volatile memory dies in parallel, wherein the controller is configured to
   manage a plurality of logical areas for storing data portions received from the host and parities calculated from the data portions, the logical areas including a first logical area for storing first parity groups, each of which includes k data portions received from the host and m parities calculated from the k data portions, and a second logical area for storing second parity groups, each of which includes k' data portions received from the host and m' parities calculated from the k' data portions, where k and k' are each two or more and are different from each other, and m and m' are each one or more and are different from each other, and
   map each of the logical areas to storage locations in the non-volatile memory dies such that the data portions and the parities belonging to any one parity group are each stored in a different physical block in a set of physical blocks that are selected from different non-volatile memory dies,
   wherein the controller sets the k value and m value for the first logical area in response to a first command received from the host and sets the k' value and m' value for the second logical area in response to a second command received from the host, the first command including a first identifier for identifying the first logical area and the second command including a second identifier for identifying the second logical area.

2. The memory system according to claim 1,
   wherein a write request for the first logical area received from the host includes the first identifier, and a write request for the second logical area received from the host includes the second identifier.

3. The memory system according to claim 2, wherein the logical areas are virtual blocks, and
   the controller is configured to allocate a first set of physical blocks including (k+m) physical blocks selected from (k+m) different non-volatile memory dies for the first logical area such that write data received with the write request including the first identifier is written into the physical blocks of the first set, and allocate a second set of physical blocks including (k'+m') physical blocks selected from (k'+m') different non-volatile memory dies for the second logical area such that write data received with the write request including the second identifier is written into the physical blocks of the second set.

4. The memory system according to claim 2, wherein the logical areas are namespaces.

5. The memory system according to claim 1,
   wherein the controller is configured to increase an available capacity of the memory system by removing at least one of the m parities or at least one of the m' parities from the non-volatile memory.

6. The memory system according to claim 5,
   wherein, in the case one of the m parities is removed, when the host requests reading of a data within a first parity group and a non-volatile memory die that stores the data portion of the reading target is performing a write process, the controller reads contents of the first parity group except for the removed parity and the data portion which is the reading target, restores the data portion which is the reading target by using the read contents of the first parity group, re-calculates the removed parity by using the restored data portion which is the reading target and the read contents of the first parity group, and stores the re-calculated parity in a cache area within the memory system.

7. The memory system according to claim 5,
   wherein the controller stores the parity to be removed from the non-volatile memory in a cache area within the memory system.

8. The memory system according to claim 7,
   wherein the controller is configured to determine removal priorities of parities stored in the non-volatile memory or the cache area, and change the removal priorities when a notification of a reading target area is received from the host.

9. The memory system according to claim 8, wherein the notification received from the host is of a predicted reading target area.

10. The memory system according to claim 5,
    wherein the controller is configured to notify the host when the parity is removed from the cache area, the notification including an identifier of a parity group to which the removed parity belongs.

11. The memory system according to claim 1,
    wherein the controller is configured to limit the write operations simultaneously performed on the (k+m) non-volatile memory dies corresponding to the first logical area to be equal to or less than the m by scheduling execution timings of write requests received from the host.

12. A method of controlling a non-volatile memory that includes a plurality of non-volatile memory dies that are controlled in parallel, each of the non-volatile memory dies including a plurality of physical blocks, said method comprising:

managing a plurality of logical areas for storing data portions received from a host and parities calculated from the data portions, the logical areas including a first logical area for storing first parity groups, each of which includes k data portions received from the host and m parities calculated from the k data portions, and a second logical area for storing second parity groups, each of which includes k' data portions received from the host and m' parities calculated from the k' data portions, where k and k' are each two or more and are different from each other, and m and m' are each one or more and are different from each other, and mapping each of the logical areas to storage locations in the non-volatile memory dies such that the data portions and the parities belonging to any one parity group are each stored in a different physical block in a set of physical blocks that are selected from different non-volatile memory dies, wherein the k value and m value are set for the first logical area in response to a first command received from the host and the k' value and m' value are set for the second logical area in response to a second command received from the host, the first command including a first identifier for identifying the first logical area and the second command including a second identifier for identifying the second logical area.

13. The method according to claim 12, further comprising:

setting the k value and m value for the first logical area in response to a first command received from the host; and setting the k' value and m' value for the second logical area in response to a second command received from the host, wherein the first command includes a first identifier for identifying the first logical area and the second command includes a second identifier for identifying the second logical area.

14. The method according to claim 13, wherein a write request for the first logical area received from the host includes the first identifier, and a write request for the second logical area received from the host includes the second identifier.

15. The method according to claim 14, wherein the logical areas are virtual blocks, and a first set of physical blocks including (k+m) physical blocks selected from (k+m) different non-volatile memory dies is allocated for the first logical area such that write data received with the write request including the first identifier is written into the physical blocks of the first set, and a second set of physical blocks including (k'+m') physical blocks selected from (k'+m') different non-volatile memory dies is allocated for the second logical area such that write data received with the write request including the second identifier is written into the physical blocks of the second set.

16. The method according to claim 14, wherein the logical areas are namespaces.

17. The method according to claim 12, further comprising:

increasing an available capacity of the non-volatile memory by removing at least one of the m parities or at least one of the m' parities from the non-volatile memory.

18. A computing device comprising:

a host; and a memory system including a host interface configured to receive commands from the host device, a nonvolatile memory having a plurality of memory dies that are controlled in parallel, each of the non-volatile memory dies including a plurality of physical blocks, and a controller configured to manage a plurality of logical areas for storing data portions received from the host and parities calculated from the data portions, the logical areas including a first logical area for storing first parity groups, each of which includes k data portions received from the host and m parities calculated from the k data portions, and a second logical area for storing second parity groups, each of which includes k' data portions received from the host and m' parities calculated from the k' data portions, where k and k' are each two or more and are different from each other, and m and m' are each one or more and are different from each other, and map each of the logical areas to storage locations in the non-volatile memory dies such that the data portions and the parities belonging to any one parity group are each stored in a different physical block in a set of physical blocks that are selected from different non-volatile memory dies, wherein the controller sets the k value and m value for the first logical area in response to a first command received from the host and sets the k' value and m' value for the second logical area in response to a second command received from the host, the first command including a first identifier for identifying the first logical area and the second command including a second identifier for identifying the second logical area.

19. The computing device according to claim 18, wherein the controller is configured to increase an available capacity of the memory system by removing at least one of the m parities or at least one of the m' parities from the non-volatile memory.

* * * * *